US008089553B2

(12) United States Patent
Suzuki et al.

(10) Patent No.: US 8,089,553 B2
(45) Date of Patent: Jan. 3, 2012

(54) LENS DRIVE DEVICE, IMAGE PICKUP DEVICE AND LENS DRIVE METHOD

(75) Inventors: Yohsuke Suzuki, Yokohama (JP); Takuroh Yasuda, Tokyo (JP); Kaoru Ito, Yokohama (JP); Katsuhiko Nuno, Yokosuka (JP)

(73) Assignee: Ricoh Company, Ltd., Tokyo (JP)

( * ) Notice: Subject to any disclaimer, the term of this patent is extended or adjusted under 35 U.S.C. 154(b) by 493 days.

(21) Appl. No.: 12/270,391

(22) Filed: Nov. 13, 2008

(65) Prior Publication Data
US 2009/0141135 A1 Jun. 4, 2009

(30) Foreign Application Priority Data

Nov. 14, 2007 (JP) .................................. 2007-296059
Mar. 6, 2008 (JP) .................................. 2008-056035
Sep. 25, 2008 (JP) .................................. 2008-245652

(51) Int. Cl.
G03B 13/24 (2006.01)
G03B 17/00 (2006.01)
H04N 5/228 (2006.01)

(52) U.S. Cl. .......... 348/335; 348/208.5; 396/50; 396/55
(58) Field of Classification Search .................. 348/335, 348/352, 357; 396/50, 52, 53, 65, 66, 90
See application file for complete search history.

(56) References Cited

U.S. PATENT DOCUMENTS

| 5,057,925 | A | 10/1991 | Tsutsui et al. | |
|---|---|---|---|---|
| 5,771,407 | A * | 6/1998 | Imafuji et al. | 396/55 |
| 7,218,460 | B2 | 5/2007 | Nuno | |
| 7,259,923 | B2 | 8/2007 | Nuno et al. | |
| 7,382,553 | B2 | 6/2008 | Nuno | |
| 2005/0129392 | A1 * | 6/2005 | Shinohara | 396/50 |
| 2005/0207743 | A1 * | 9/2005 | Uehara | 396/50 |
| 2006/0017836 | A1 | 1/2006 | Nuno et al. | |
| 2006/0018654 | A1 | 1/2006 | Nuno et al. | |
| 2006/0204232 | A1 * | 9/2006 | Weinberg et al. | 396/50 |
| 2007/0201848 | A1 * | 8/2007 | Taguchi | 396/55 |
| 2007/0223900 | A1 * | 9/2007 | Kobayashi et al. | 396/50 |
| 2008/0019681 | A1 | 1/2008 | Nuno | |
| 2008/0117527 | A1 | 5/2008 | Nuno et al. | |

FOREIGN PATENT DOCUMENTS

| JP | 04-13943 | 2/1992 |
|---|---|---|
| JP | 06-300962 | 10/1994 |
| JP | 2948840 | 7/1999 |
| JP | 2001-291097 | 10/2001 |
| JP | 2005-265448 | 9/2005 |

(Continued)

*Primary Examiner* — David Ometz
*Assistant Examiner* — Dwight C Tejano
(74) *Attorney, Agent, or Firm* — Dickstein Shapiro LLP

(57) ABSTRACT

A lens drive device in at least one lens barrel holding a lens moveably includes a motor to drive the lens; an acceleration detection section to detect an acceleration; and an output control section to control an output of the motor corresponding to the acceleration detected by the acceleration detection section. The output control section determines whether the acceleration detected by the acceleration detection section falls within a predetermined acceleration range or not. When the acceleration is determined to be within the range, a further determination of whether the lens drive device is in a stationary state is performed. When it is determined not being in the stationary state, the motor is driven by a maximum drive voltage. When it is determined being in the stationary state, a further determination of whether the posture is horizontal or not is performed.

18 Claims, 22 Drawing Sheets

FOREIGN PATENT DOCUMENTS

| | | |
|---|---|---|
| JP | 3750396 | 12/2005 |
| JP | 2006-287768 | 10/2006 |
| JP | 2006-323121 | 11/2006 |
| JP | 2006-330657 | 12/2006 |
| JP | 3896505 B | 1/2007 |

* cited by examiner

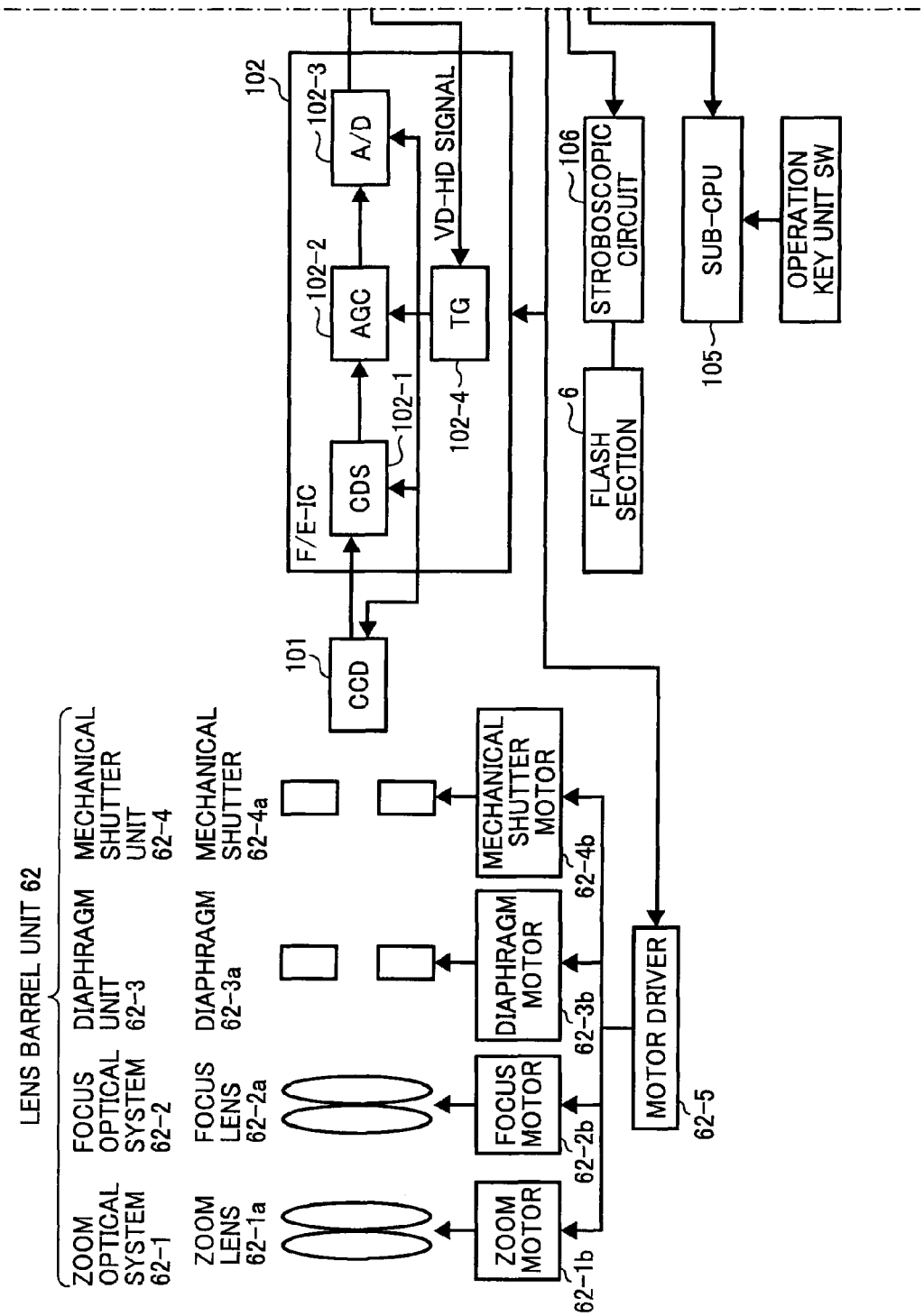

FIG. 20A

| DETERMINATION CONDITION | | HORIZONTAL | OVER 1G | DOWNWARDS | UPWARDS |
|---|---|---|---|---|---|
| VOLTAGE TABLE | | T1 | T2 | T3 | T4 |
| VOLTAGE SET | EXTENSION | T1a | T2a | T3a | T4a |
| | COLLAPSE | T1b | T2b | T3b | T4b |

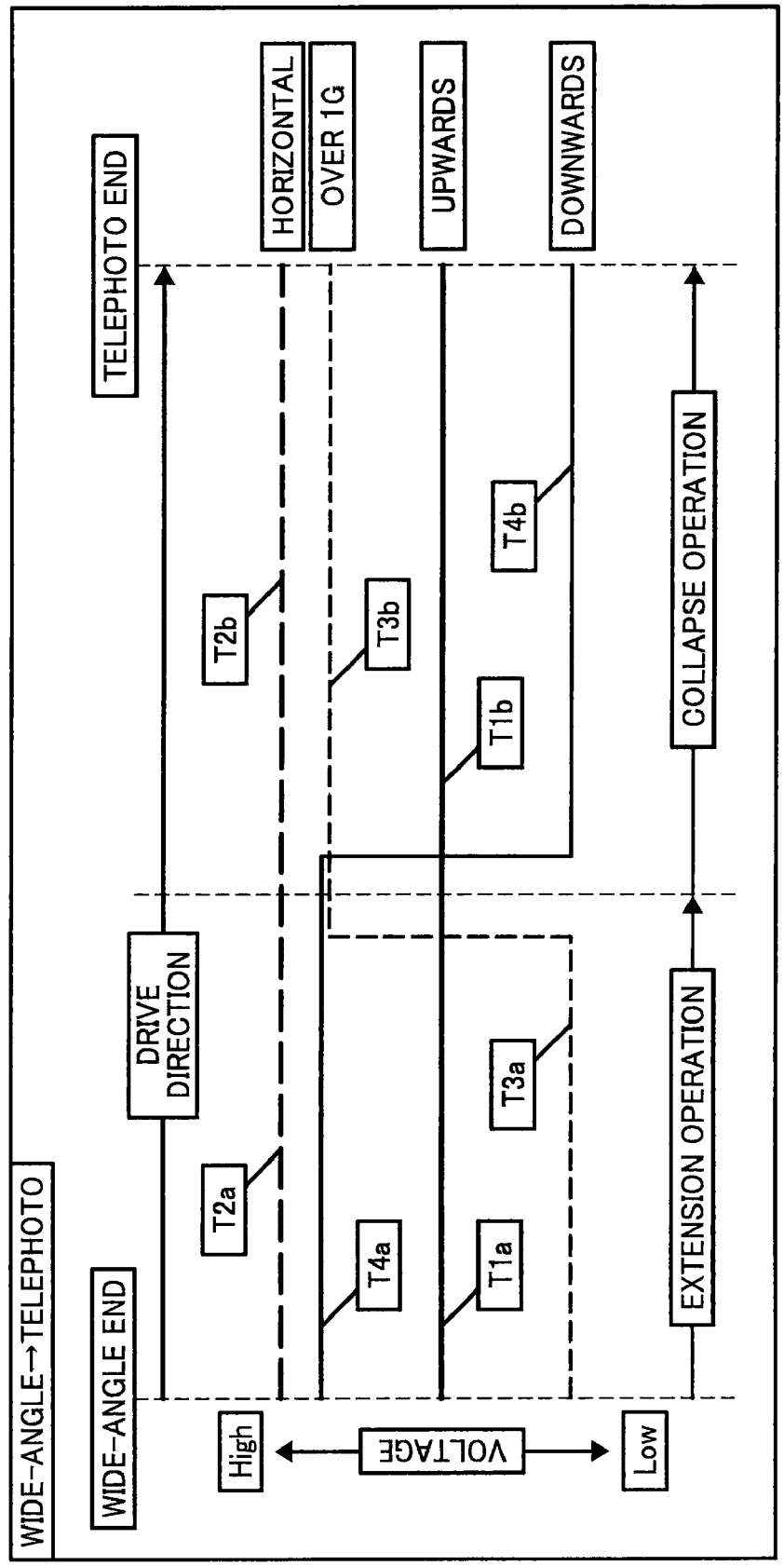

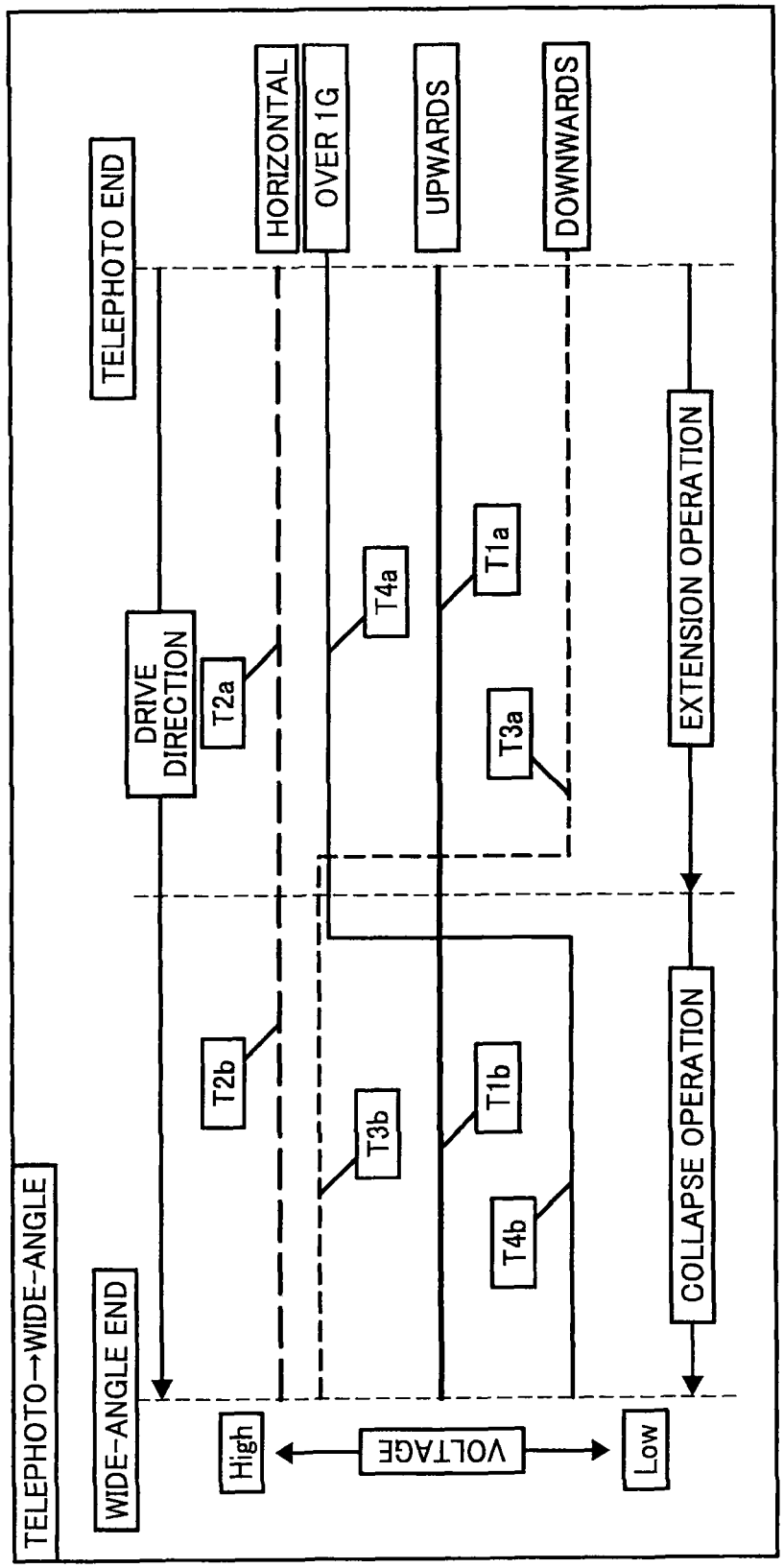

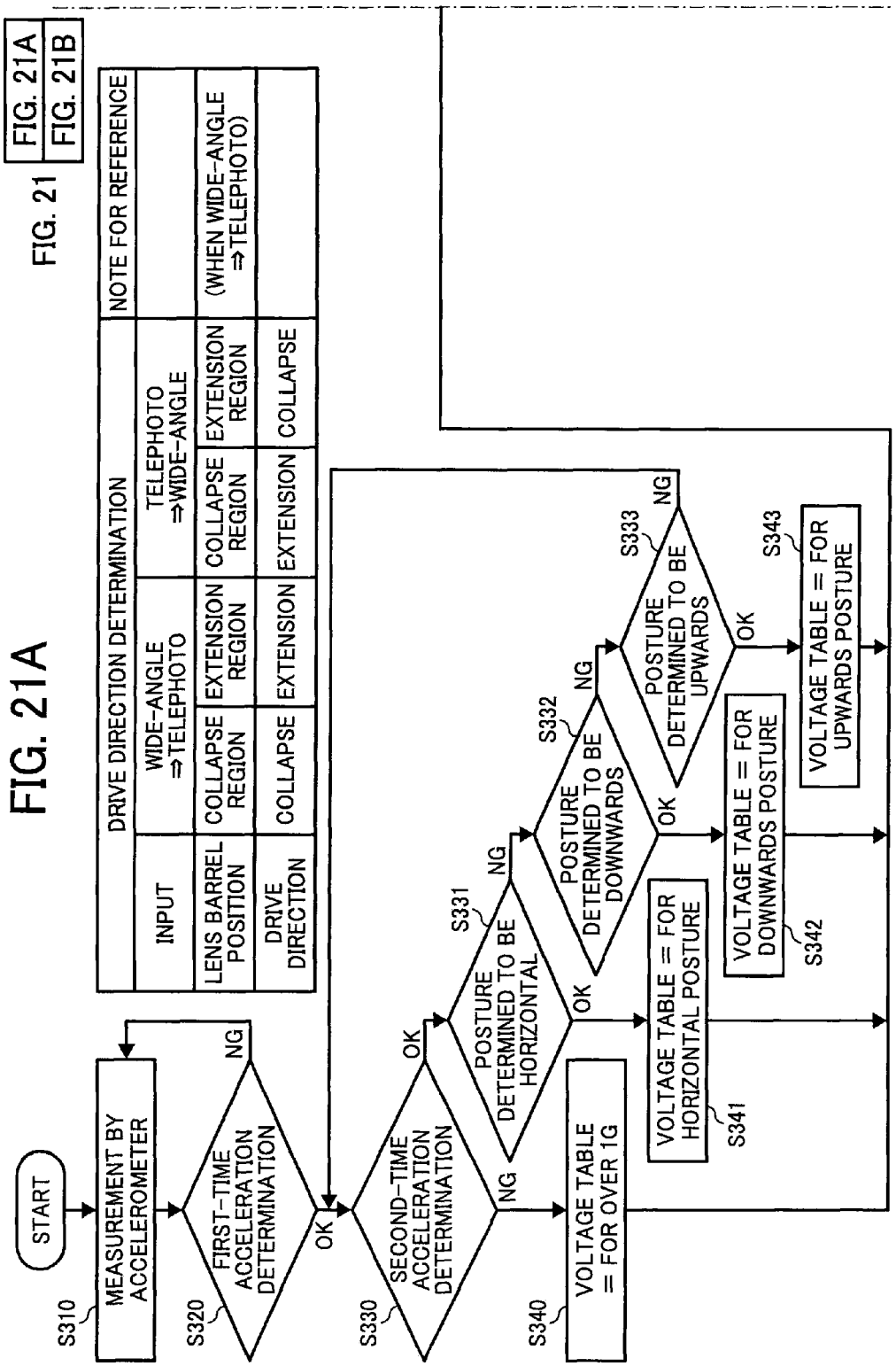

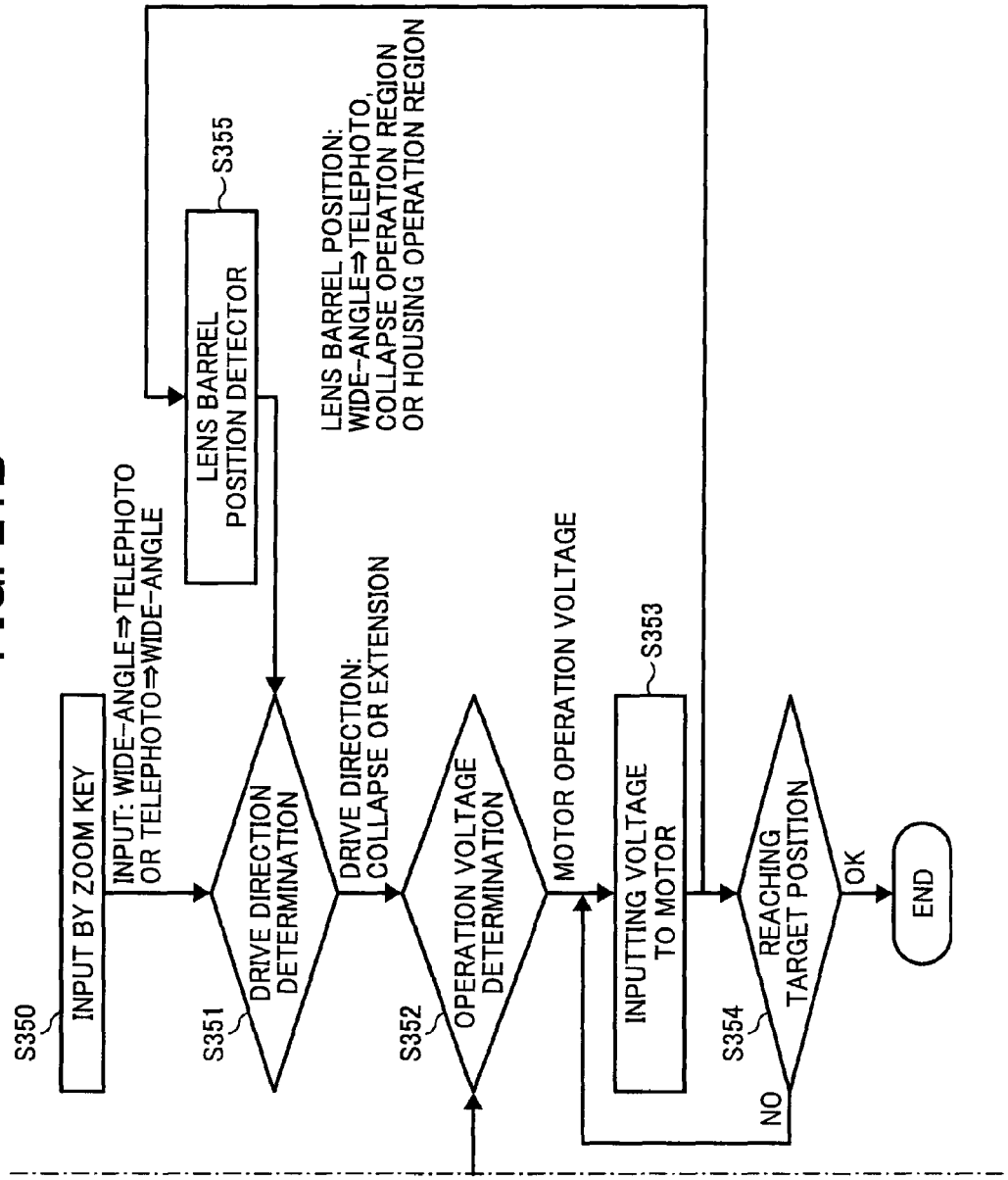

LENS DRIVE DEVICE, IMAGE PICKUP DEVICE AND LENS DRIVE METHOD

CROSS-REFERENCE TO THE RELATED APPLICATIONS

The present application is based on and claims priority benefit from each of Japanese Patent Application Nos. 2007-296059, filed on Nov. 14, 2007, 2008-056035, filed on Mar. 6, 2008, and 2008-245652 filed on Sep. 25, 2008, the disclosures of which are incorporated herein by reference in their entirety.

BACKGROUND OF THE INVENTION

1. Field of the Invention

The present invention relates to a lens drive device, an image pickup device and a lens drive method, configured to control a lens barrel drive force, by detecting a posture and an operation of the image pickup device by use of an acceleration sensor and based on the detected information.

2. Description of the Related Art

In recent years, image pickup accuracy, rapidness, as well as low power consumption and drive stability have been further highly required of an image pickup device, such as a digital camera.

In order to satisfy these requirements, a built-in accelerometer is fitted into the image pickup device to detect a posture or a motion direction thereof with respect to a direction of gravity of the image pickup device and to perform various controls of the image pickup device based on information obtained by the accelerometer.

In order to photograph with high accuracy, one of the problems that remain to be solved is that an out of focus image is sometimes undesirably photographed depending on the posture of the image pickup device. Such a problem is caused by a still-position deviation of a lens existing in a lens drive unit, resulting from a looseness, such as a play or a backlash, thereby lacking sharpness in a photograph.

To deal with such a problem, it is proposed that an acceleration sensor be provided to detect the posture of the image pickup device via an output of the acceleration sensor. Corresponding to the detected posture of the image pickup device, the lens stationary position deviation is corrected, thereby allowing photography with high accuracy (For reference, see Japanese Application Publication Number Hei6-300962 and Japanese Application Publication Number 2005-265448).

Furthermore, in order to photograph rapidly, one of the problems that remain to be solved is that it is rather time-consuming to perform a focus adjustment; for example, when an automatic focusing is performed at the time of photographing, while moving the lens along the optical axis in order to determine a focus where an edge component of a photographed image reaches a peak. Since a range to perform focusing needs to be set wide, the focus adjustment becomes time-consuming.

To deal with such a problem, it is proposed that a subject position be predicted based on a posture of the image pickup device to narrow the range to perform focus adjustment, whereby rapid photographing can be expected to be realized (For reference, see Japanese Application Publication Number 2006-323121).

Meanwhile, concerning the image pickup device, a force (torque) necessary to drive a lens barrel varies with the posture of the image pickup device and a direction of the drive. For example, concerning the image pickup device having a collapsible lens barrel, when the lens barrel is placed in the gravity direction, namely downwards, the gravity promotes an extension of the lens barrel. In contrast, when the lens barrel is placed in the direction opposite to the gravity direction, namely upwards, the gravity facilitates a collapse or housing of the lens barrel.

Considering the above, on the one hand, to extend the lens barrel, when a photographing lens is placed upwards, a maximum torque is required because the gravity impedes the extension of the lens barrel. When the photographing lens is placed horizontally, a second largest torque is required. When the photographing lens is placed downwards, a minimum torque is required because the gravity facilitates the extension of the lens barrel with the gravity direction being consistent with the extension direction.

On the other hand, to house the lens barrel, when the photographing lens is placed downwards, a maximum torque is required because the gravity impedes the housing of the lens barrel. When the photographing lens is placed horizontally, a second largest torque is required. When the photographing lens is placed upwards, a minimum torque is required because the gravity facilitates the housing of the lens barrel with the gravity direction being consistent with the housing direction.

As illustrated heretofore, although the torque necessary to extend and house the lens barrel varies with the posture of the image pickup device, a conventional image pickup device always extends and houses the lens barrel with a constant drive torque.

More specifically, despite the fact that the maximum torque (a maximum extension torque will be used hereinafter) is required to extend the lens barrel when the photographing lens is placed upwards, the conventional image pickup device always extends the lens barrel unalterably with the maximum torque even when the photographing lens is placed in other postures. Likewise, despite the fact that the maximum torque (a maximum housing torque will be used hereinafter) is required to house the lens barrel when the photographing lens is placed downwards, the conventional image pickup device always houses the lens barrel unalterably with the maximum torque even when the photographing lens is placed in other postures.

The maximum extension torque and the maximum housing torque will be referred to as a maximum drive torque hereinafter. As illustrated heretofore, since the conventional image pickup device always drives the lens barrel unalterably with the maximum drive torque even when a smaller drive torque will do, a superfluous amount of electricity is consumed. Consequently, it is difficult for the image pickup device to meet the demand of energy-saving.

Moreover, concerning the conventional image pickup device, although a torque corresponding to the maximum drive torque required to extend and to house the lens barrel is set, the lens barrel has not been driven by a torque larger than the maximum drive torque. However, for example, in the cases wherein the image pickup device is operated in the middle of an intense movement or is forcibly taken out of a bag or a pocket, because an acceleration produced at the time operates, the lens barrel may not be able to be driven unless by the torque which is larger than the aforementioned maximum drive torque. In these cases, since neither the drive of the lens barrel is able to start nor the drive is able to be maintained, there is a problem with the conventional image pickup device in that a stable drive of the lens barrel cannot be realized.

In addition, there is also a collapsible lens barrel in which when in a non-photographing state, at least one group of lenses retreats sideways from a lens optical axis at the time of photographing and other lens groups are housed in an image pickup device body. Concerning such a collapsible lens barrel, when a power switch is turned on to photograph, if an acceleration larger than the prescribed value is applied to the image pickup device in the middle of moving the respective lens groups to photographing positions, occasionally the respective lens groups are not able to be moved to the photographing positions. The reason is that when the acceleration is applied to the lens groups, especially to the aforementioned lens group, which retreats sideways from the lens optical axis at the time of photographing, the torque becomes insufficient to move this lens group.

SUMMARY OF THE INVENTION

An object of the present invention is to provide a lens drive device, an image pickup device and a method of lens drive, which is capable of suppressing the power consumption and securing a stable drive of a lens barrel. More specifically, the power consumption can be suppressed via detecting a posture of the image pickup device by a built-in acceleration sensor fitted into the image pickup device and then based on the detected information, adjusting a torque necessary to drive the lens barrel holding lenses. The stable drive of the lens barrel can be secured via terminating the drive of the lens barrel upon the detected acceleration exceeding a prescribed range.

In the middle of the lens being moved along the optical axis by the lens drive device, for example, to perform an operation such as zooming, the lens movement direction may be reversed. When the lens is driven while the posture of the lens drive device remains unchanged, the force required to drive the lens varies before and after the switch of the lens movement direction. Therefore, based on the detected information obtained from the acceleration sensor, the output of the lens drive device is appropriately controlled, whereby the superfluous power consumption can be suppressed, and the stable drive can be secured. It is also an object of the invention to provide such a lens drive device.

In order to achieve the above object, according to one embodiment of the present invention, a lens drive device is provided in a lens barrel holding a lens moveably, including: a motor to drive the lens; an acceleration detection section to detect an acceleration; and an output control section to control an output of the motor corresponding to the acceleration detected by the acceleration detection section; wherein the output control section determines whether the acceleration detected by the acceleration detection section falls within a predetermined acceleration range or not, when the acceleration is determined to be within the range, a further determination of whether being in a stationary state is performed, and when it is determined as not being in the stationary state, the motor is driven by a maximum drive voltage, while when it is determined as being in the stationary state, a further determination of whether the posture is horizontal or not is performed, when being horizontal is determined, the motor is driven by a drive voltage appropriate for being horizontal, while when it is determined as not being horizontal, a further determination is performed of whether to drive the motor in the gravity direction or in the direction opposite to the gravity direction, when it is determined to drive the motor in the gravity direction, the motor is driven by a lower voltage than the drive voltage appropriate for being horizontal, while when otherwise, the motor is driven by a voltage higher than the drive voltage appropriate for being horizontal and lower than the maximum drive voltage.

BRIEF DESCRIPTION OF THE DRAWINGS

FIG. 20 corresponds to a fourth embodiment of the present invention, in which

FIG. 20A is a table indicating a posture determination condition and a relationship between a drive voltage of the lens drive device and a voltage table applied corresponding to a respective determined postures.

FIG. 20B is a timing diagram illustrating a fluctuation in the drive voltage of the lens drive device when the lens is moved from the wide-angle end to the telephoto end.

FIG. 20C is a timing diagram illustrating a fluctuation in the drive voltage of the lens drive device when the lens is moved from the telephoto end to the wide-angle end.

FIG. 21 is a flow chart illustrating an operation of the fourth embodiment of the present invention.

DETAILED DESCRIPTION OF THE PREFERRED EMBODIMENTS

Preferred embodiments of the present invention will be described in detail below with reference to the accompanying drawings.

FIGS. 1 to 17 illustrate a first embodiment in which a lens drive device according to the present invention is applied to a digital camera.

Figure 1:
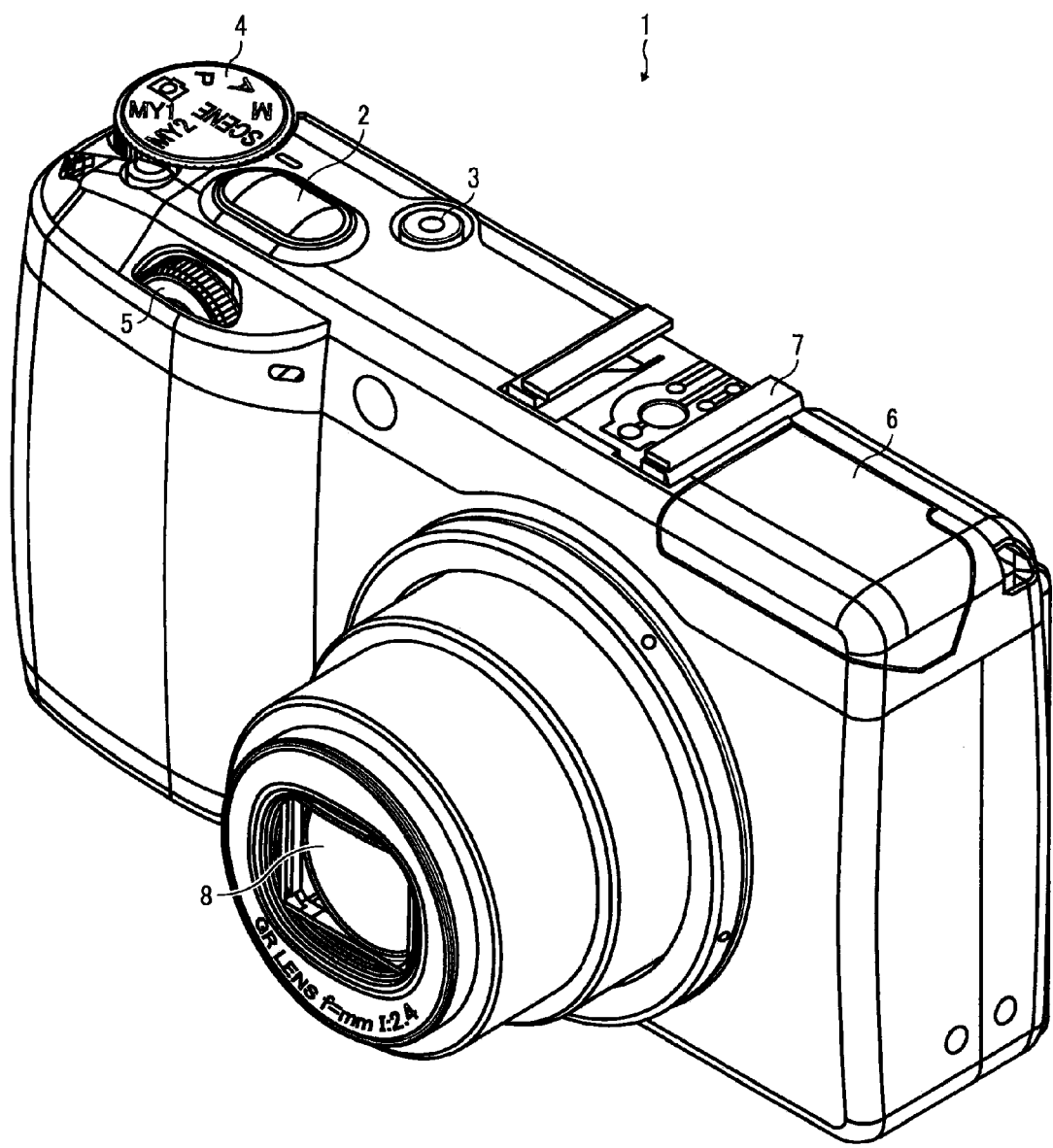
FIG. 1 is a front perspective view of a digital camera according to a first embodiment of the present invention.
Figure 2:
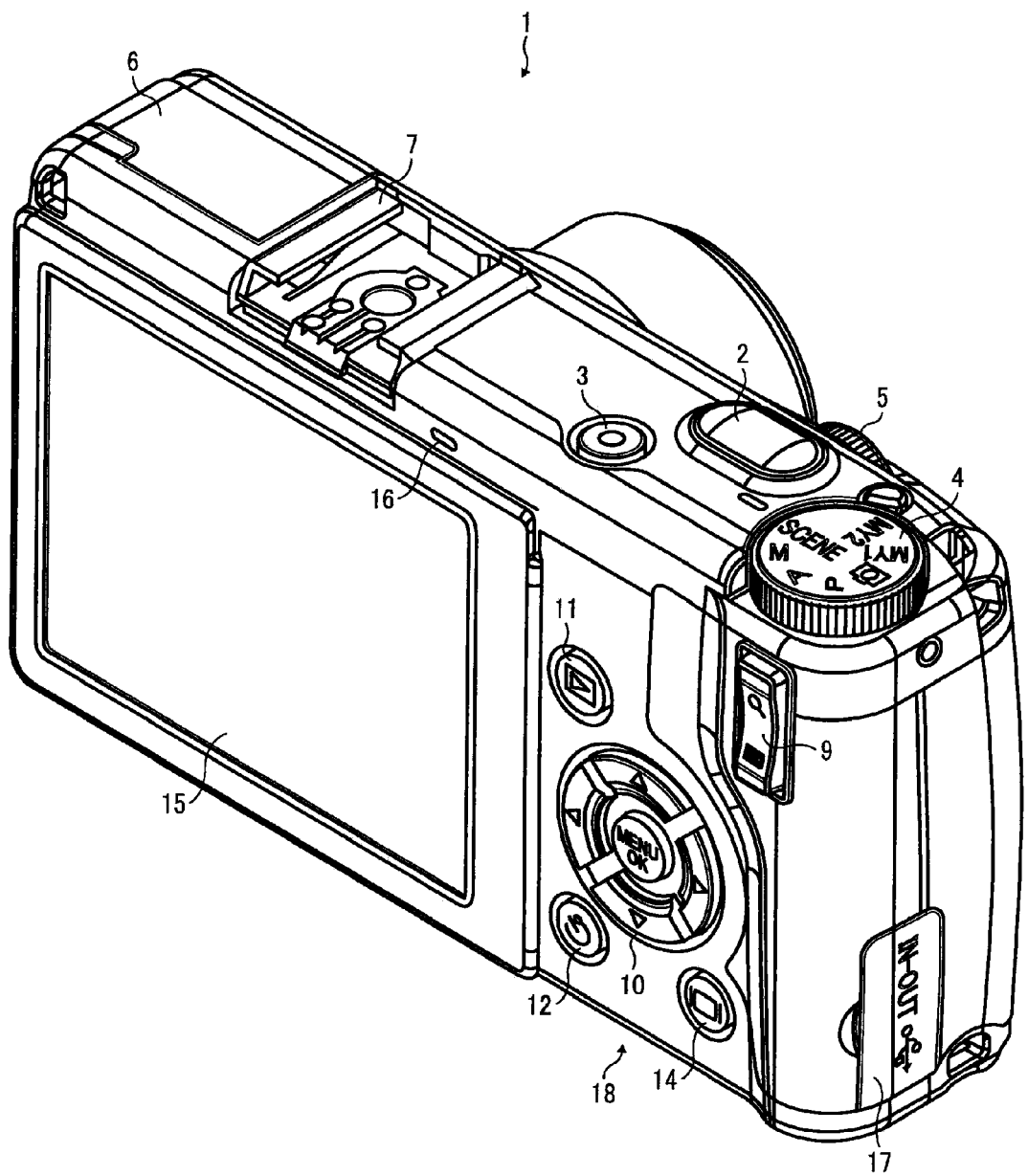
FIG. 2 is a rear perspective view of the digital camera according to the first embodiment of the present invention.

As shown in FIG. 1 and FIG. 2, on an upper surface of a camera main body 1, there are provided a shutter button 2 (a release button) which is pressed to photograph; a power switch button 3; a mode dial 4, used to switch an operation mode; a shift dial 5; a flash section 6 accommodated in the camera which pops up when necessary; and an accessory shoe 7 whereto an external flash and an external optical finder provided. In the front of the camera main body 1, there is provided a photographing lens 8 (photographing lens 8 collectively refers to plural lenses included in a lens barrel unit 62, which will be illustrated hereinafter).

In the rear of the camera main body 1, there are provided a zoom button 9; menu cursor instruction buttons and selection instruction buttons 10; a replay button 11; a deletion/self-timer button 12; a monitor screen 15, which is an electronic view panel such as a LCD panel, to display a subject or mode information; a switch button 14 to switch the display of the monitor screen 15; and a light emitting diode 16 (an LED display section), which is lighted indicating either being within a charge period of the flash or being in an in-focus state. At the flank of the camera main body 1, there is provided a terminal lid 17, which covers an AV terminal entrance and an USB terminal entrance (external connection terminal entrance). At the bottom of the camera main body 1, there is provided a battery lid 18, which covers a battery insertion entrance and an insertion entrance of a memory card to record an image.

Then, the constitution inside of the digital camera 1 will be illustrated hereinafter.

Figure 3:
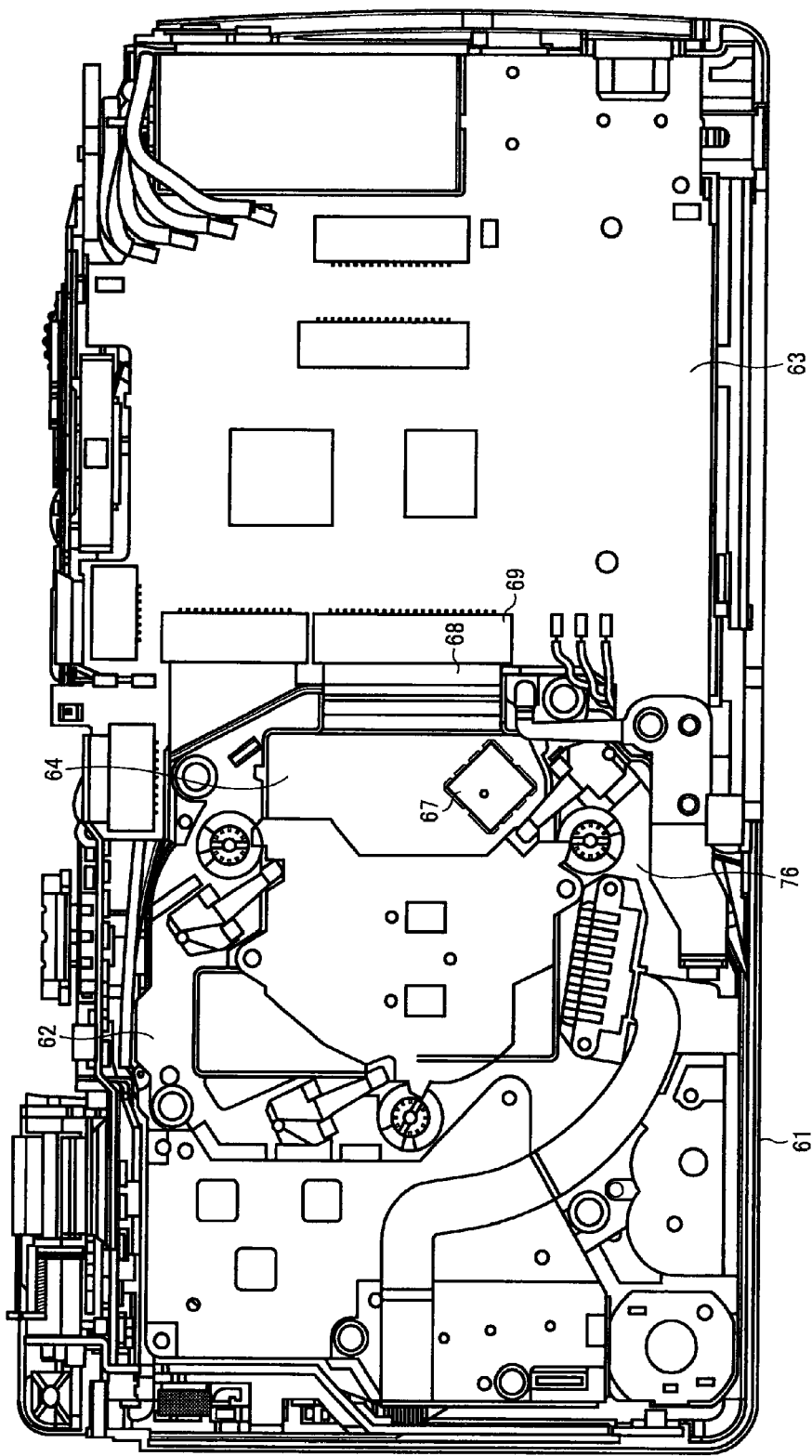
FIG. 3 is a rear view of the digital camera with a rear cover unit and an upper cover unit detached according to the first embodiment of the present invention.
Figure 4:
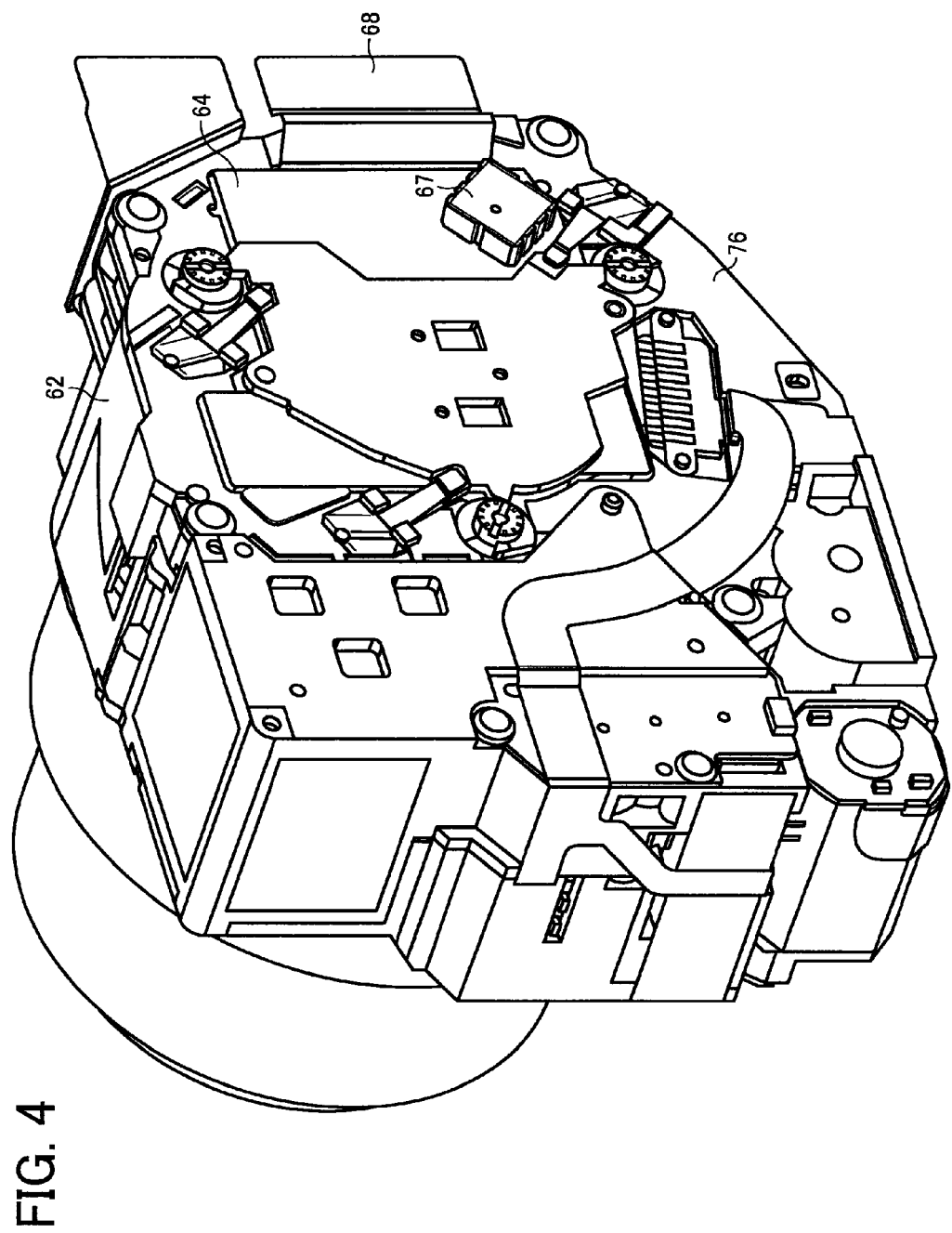
FIG. 4 is a rear perspective view of a lens barrel unit according to the first embodiment of the present invention.
Figure 5:
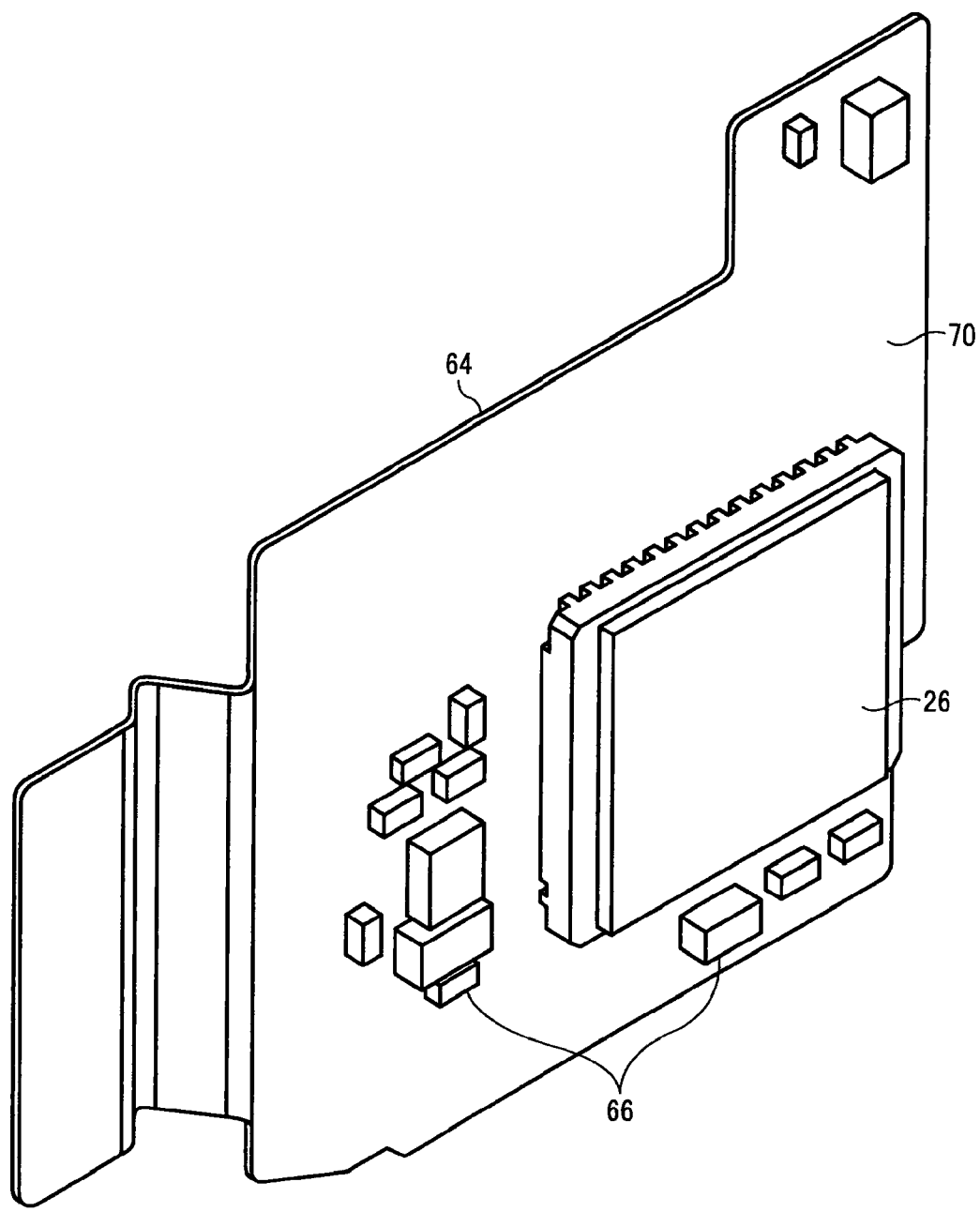
FIG. 5 is a front perspective view of an imaging element circuit board according to the first embodiment of the present invention.
Figure 6:
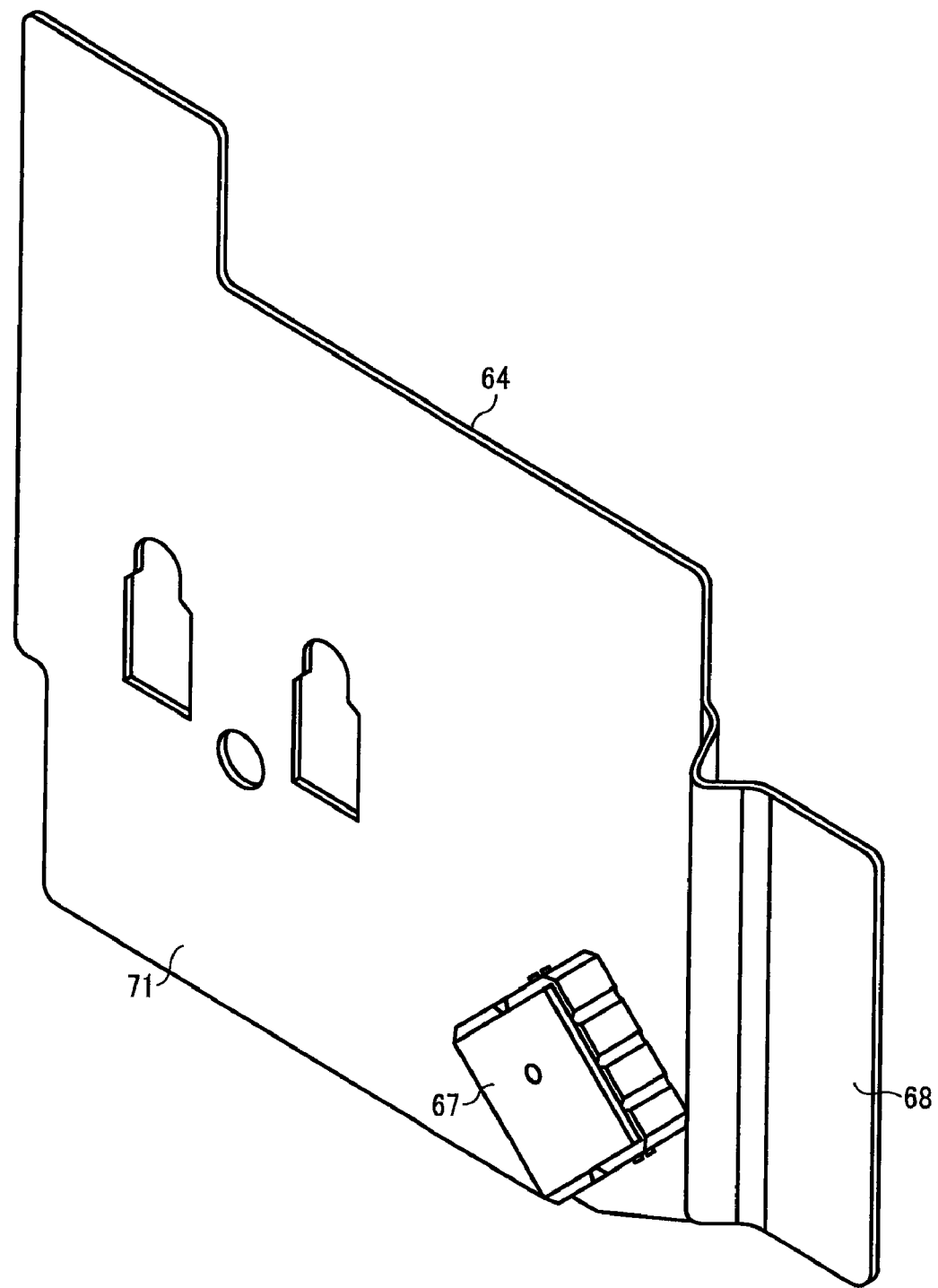
FIG. 6 is a rear perspective view of the imaging element circuit board according to the first embodiment of the present invention.

FIG. 3 is a rear view showing the digital camera after a rear cover unit and an upper cover unit are removed according to an embodiment of the present invention. FIG. 4 is a rear perspective view of a barrel unit according to an embodiment of the present invention. FIG. 5 and FIG. 6 are a front perspective view and a rear perspective view respectively of an image pickup element circuit substrate according to an embodiment of the present invention.

The imaging element circuit board 64 is provided near a rear surface of the camera main body. On a front surface 70 of the imaging element circuit board 64, there is installed a CCD 26 (See FIG. 5 for reference), serving as the image pickup element which converts the light incident via the aforementioned photographing lens 8 into an electrical signal. At the periphery of the COD 26, an electric component 66 including a front end IC, a digital still camera processor and the like, used to process signals, is installed. In addition, on a rear surface 71 of the imaging element circuit board 64, there is also installed an inclination detection sensor 67 (an acceleration sensor will also be used hereinafter), which detects an inclination based on variances in the acceleration.

The acceleration sensor 67 according to an embodiment of the present invention is a heat detection acceleration sensor installed on a PCB (a printed circuit board). The acceleration sensor 67 detects the acceleration of the three-dimensional space while dividing the acceleration into X-axis, Y-axis and Z-axis components. Here the X-axis, Y-axis and Z-axis are perpendicular to one another.

In addition, being a heat detection acceleration sensor, if this acceleration sensor 67 is disposed in the vicinity of a heat-generating device such as the image pickup element 26 or a CPU block 104-3, detection accuracy may undesirably deteriorate. Therefore, as illustrated hereinafter, the acceleration sensor 67 is disposed away from the heat-generating electrical components, whereby the deterioration in the detection accuracy due to the heat generated from the electrical components is prevented.

One end 68 of the imaging element circuit board 64 is connected with a main circuit board 63 via a connector 69, whereby the electrical signal is transmitted to the main circuit board 63. After a tilt adjustment, the imaging element circuit board 64 is assembled via being adhered to and fixed to a rear surface 76 of the lens barrel unit 62. The inclination detection sensor 67 is provided at the rear surface 76, whereby some effects can be obtained as follows.

The tilt, namely an assembly error of the inclination detection sensor 67, caused by a manufacture process of the digital camera, with respect to the image pickup element 26, can be absorbed via performing a calibration (adjustment) electrically.

However, when a user drops or bangs the camera main body 1, because of the produced shock applied to the camera, the components of the assembly may move. Consequently, the posture or the inclination of the inclination sensor 67 with respect to the image pickup element 26 may vary, which may cause an incorrect display on the monitor screen 15 (see FIG. 10 for reference) which is used to display the inclination of the camera.

However, as illustrated above, since the inclination detection sensor 67, which detects the inclination of the image pickup device, is directly mounted on the imaging circuit board 64 whereon the image pickup element 26 is provided, one advantage is that the variance in the relative inclination is not generated by such a configuration.

Furthermore, since the inclination detection sensor 67 is installed on the opposite side of the surface 70 whereon the image pickup element 26 is mounted, a space 66 for some electrical components to process signals, which are installed at the periphery of the surface 70 on the image pickup element 26 of the imaging element circuit board 64, can be secured. In addition, a space for electromechanical components of the lens barrel unit 62 can also be secured.

In addition, considering that the image pickup element 26 is a heat-generating member, the inclination detection sensor 67, which is a heat detection acceleration sensor, is provided at a position away from the image pickup element 26 and being on the different plane from that of the image pickup element 26. Thus, deterioration in the detection accuracy of the acceleration can be suppressed.

Although in one embodiment of the present invention, the inclination detection sensor 67 is installed on the rear surface 71 of the imaging element circuit board 64, the invention is not limited thereto. Hereinafter a transfiguration example will be illustrated.

Figure 7:
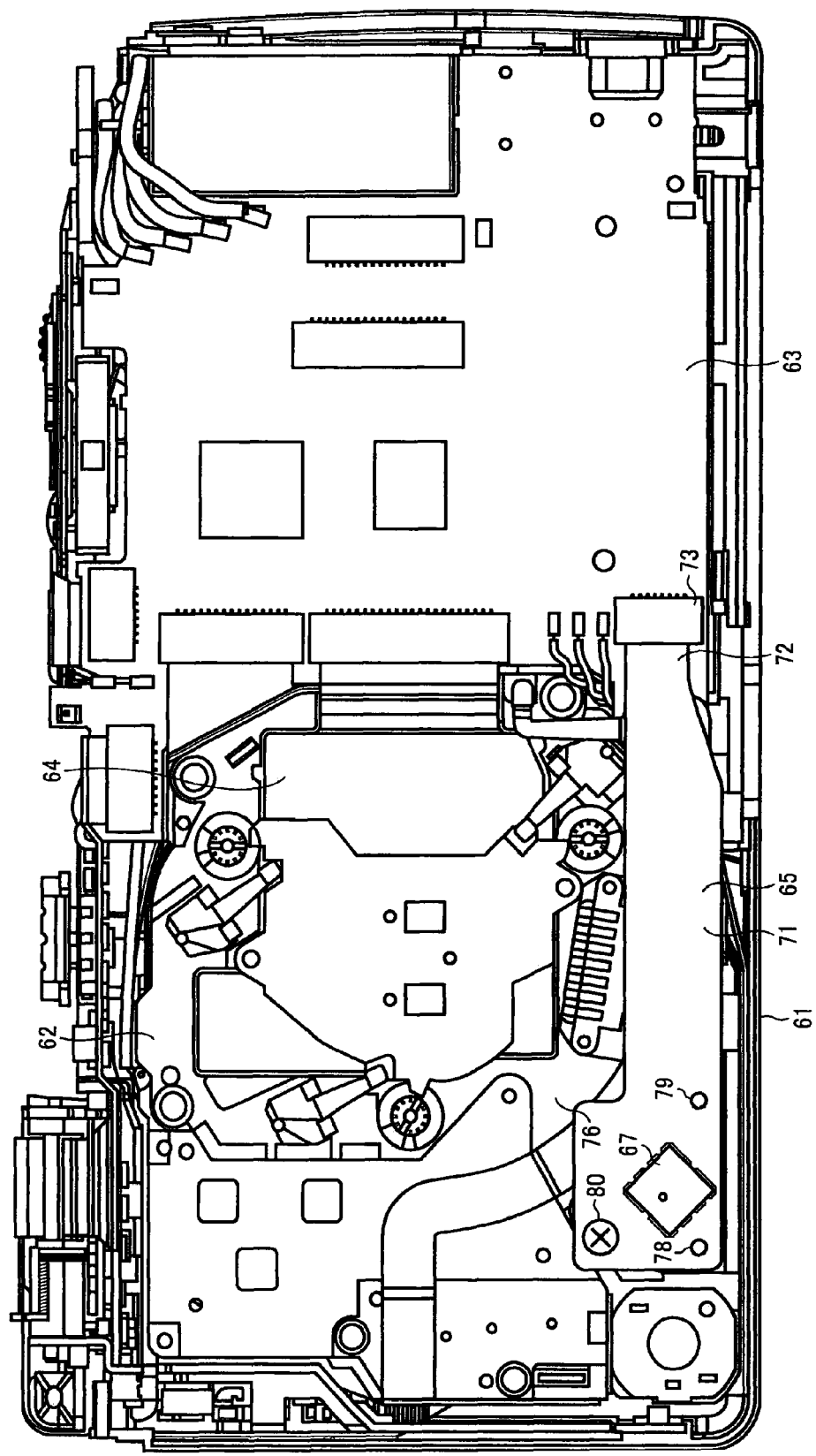
FIG. 7 is a rear view of the digital camera of a transfiguration with the rear cover unit and the upper cover unit detached according to the first embodiment of the present invention.
Figure 8:
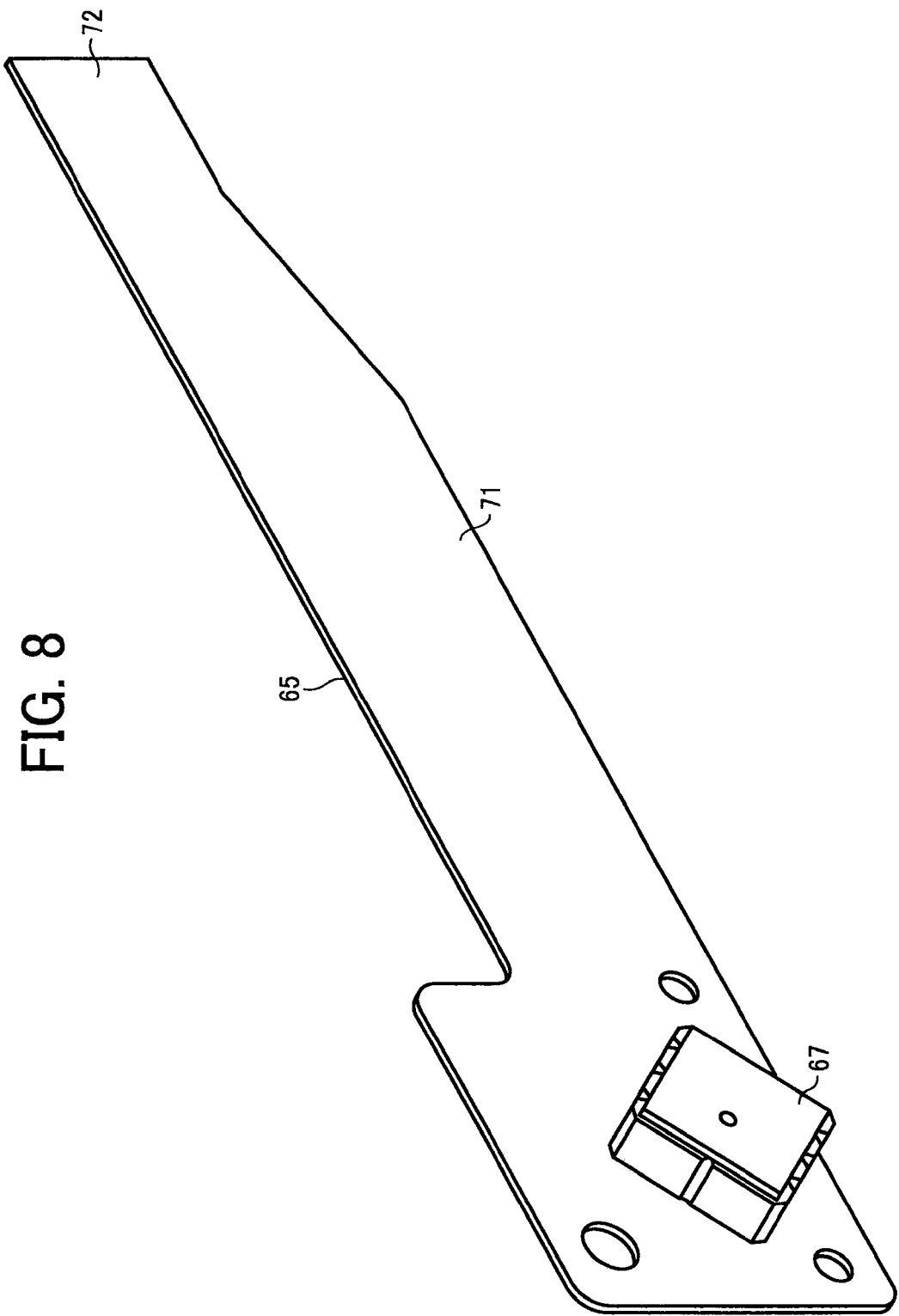
FIG. 8 is a rear perspective view of an inclination detection wiring substrate of a transfiguration according to the first embodiment of the present invention.

FIG. 7 is a rear view of the digital camera with a back cover unit and an upper cover unit detached according to a transfiguration of the present invention. FIG. 8 is a rear perspective view of an inclination detection wiring board according to a transfiguration of the present invention.

Behind the rear surface 76 of the lens barrel unit 62, an inclination detection wiring substrate 65, equipped with the inclination detection sensor 67 that detects the inclination of the image pickup device, is positioned by two bosses 78 and 79 of the lens barrel unit 62, and fixed by a screw 80. The inclination detection sensor 67 is mounted on the rear surface 71 of the inclination detection wiring substrate 65. An end 72 of the inclination detection wiring substrate 65 is connected with the main circuit board 63 via a connector 73, whereby the electrical signal obtained from the inclination detection sensor 67 is transmitted to the main circuit board 63. The inclination detection sensor 67 is mounted at such a position that some effects can be obtained as follows.

More specifically, since after the tilt adjustment, the imaging element circuit board 64, equipped with the image pickup element 26, is assembled via being adhered to and fixed to the rear surface of the lens barrel unit 62, one of the advantages is that the inclination of the image pickup element 26 with respect to the lens barrel unit 62 does not vary.

Moreover, since the inclination detection sensor 67, which detects the inclination of the image pickup device, and the aforementioned inclination detection wiring substrate 65 are fixed by the positioning screw 80, one of the advantages is that the inclination of the inclination detection sensor 67 with respect to the image pickup element 26 does not vary.

In addition, since the inclination detection sensor 67, which is a heat detection acceleration sensor, is provided at a position away from the heat-generating member, the deterioration in the detection accuracy of the acceleration can be suppressed.

The inclination detection sensor 67 can also be installed in other positions apart from the position mentioned above. For example, the inclination detection sensor 67 can also be installed in a position away from a heat-generating electrical component, such as a CPU block 104-3, on the main circuit board 63 whereon some electrical components are equipped, such as a digital still camera processor 104 having the CPU block 104-3. Thus, the deterioration in the detection accuracy of the acceleration can be suppressed.

Although according to an embodiment of the present invention, the inclination detection sensor 67 is of the type of the heat detection acceleration sensor, other types can also be used which can be equipped on the PCB, such as a piezoresistor-type acceleration sensor or a capacitance-type acceleration sensor.

In addition, although according to an embodiment of the present invention, the inclination detection sensor 67 is of the type which can be mounted on the PCB, other types can also be used which are capable of measuring accelerations in three-dimensional directions.

Next, an inner control system of the digital camera will be illustrated hereinafter.

Figure 9B:
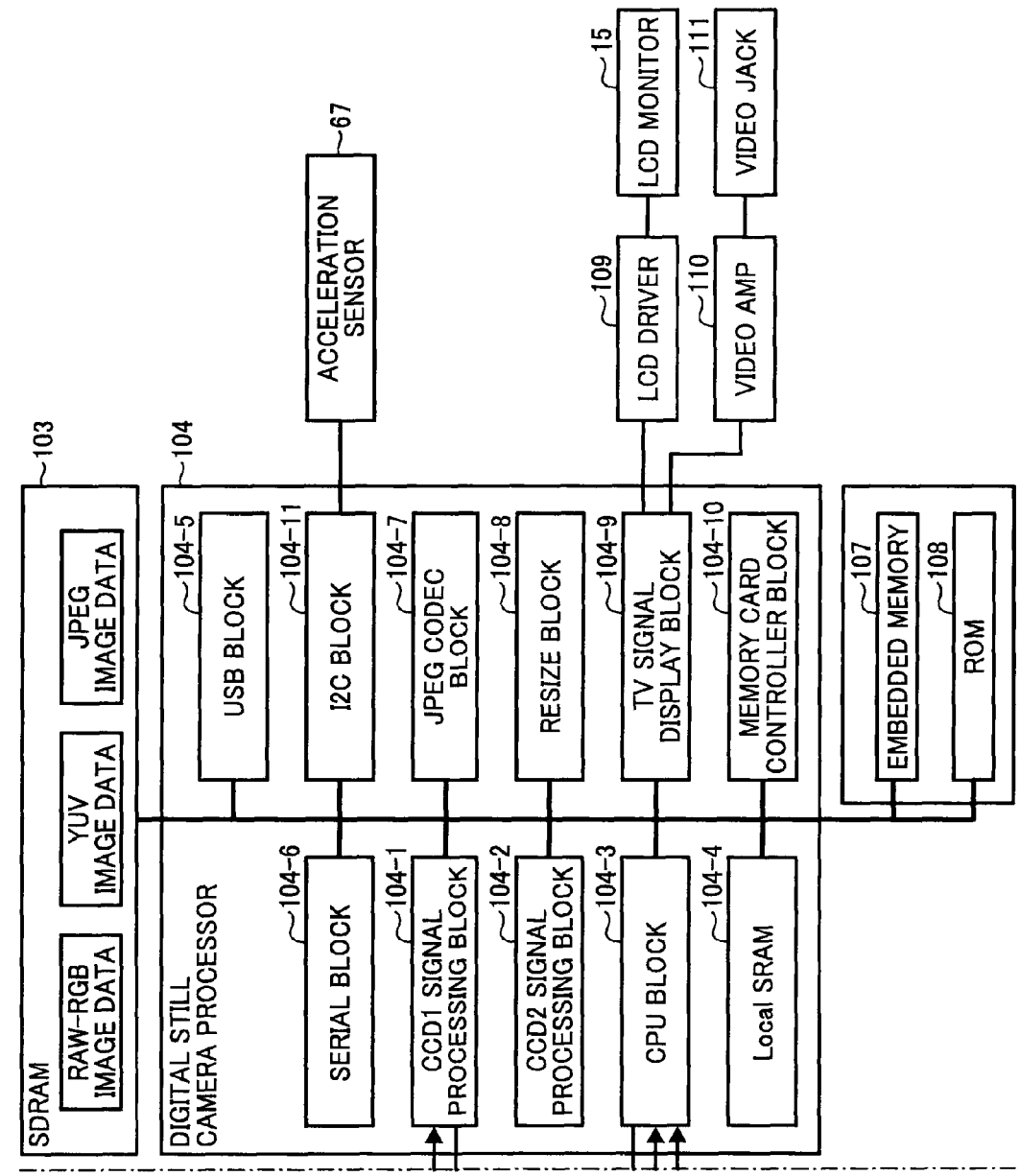
FIG. 9 is a block diagram showing a schematic construction of a built-in control system of the digital camera according to the first embodiment of the present invention.

FIG. 9 is a block diagram schematically showing a configuration of the inner control system of the digital camera according to an embodiment of the present invention. As shown in the FIG. 9, the digital camera comprises the lens barrel unit 62 including various lenses and motors, a CCD 101 which is built in the camera main body 1, a front end IC 102 to apply various adjustments to the image data, a digital still camera processor 104 (hereinafter also referred to as processor) which plays a central role for the overall control and data processing of the camera main body 1, an SDRAM 103 which temporarily stores an image data whereto various processing is performed, an embedded memory 107 and a ROM 108.

The lens barrel unit 62 includes a photographic lens optical system, a lens barrel and a motor which is composed of a plurality of pulse motors to drive each part of the lens barrel unit. The focusing at the time of photographing and an adjustment of a diaphragm at the time of exposure are performed via the lens barrel unit 62. More specifically, the lens barrel unit 62 is composed of a zoom optical system 62-1 including a zoom lens 62-1*a* to pick up an image of the subject and a zoom drive motor 62-1*b*; a focus optical system 62-2 including a focus lens 62-2*a* and a focus drive motor 62-2*b*; a diaphragm unit 62-3 including a diaphragm 62-3*a* and a diaphragm motor 62-3*b*; a mechanical shutter unit 62-4 including a mechanical shutter 62-4*a* and a mechanical shutter motor 62-4*b*; and a motor driver 62-5 to drive the respective motors.

A subject image obtained from the lens barrel unit 62 at the time of photographing is formed on the imaging surface of the CCD 101 built-in the camera body 1. The CCD 101 converts the subject image data into an electrical signal (analog data) and outputs the electrical signal to a front end IC (F/E-IC is used in FIG. 9). The front end IC 102 comprises a CDS 102-1 which performs correlated double sampling to eliminate image noise, an AGC 102-2 for gain adjustment, an A/D converter 102-3 which performs analog-digital conversion, and a TG 102-4 (a drive timing signal generating section) which receives vertically synchronized signals (hereinafter referred to as "VD") and horizontally synchronized signals (hereinafter referred to as "HD") from CCD1 signal processing block 104-1 in the digital still camera processor 104. Here, the TG 102-4 is controlled by a CPU block 104-3. The front end IC 102 is used to apply various adjustments to the data received from the CCD 101.

The electrical signal whereto various adjustments are applied by the front end IC 102 is then conveyed to the digital still camera processor 104. As mentioned above, the digital still camera processor 104 plays a central role for the overall control of the camera main body 1 and data processing for an image file conveyed as an electrical signal.

The digital still camera processor 104 performs a white balance setting and a Gamma setting for output data obtained from the CCD 101 and conveyed to the front end IC 102. The digital still camera processor 104 comprises the CCD1 signal processing block 104-1 which supplies VD signals and HD signals, the CCD2 signal processing block 104-2 to perform conversion to brightness data and color difference data via filtering, the CPU block 104-3 to control the operations of the various constituent sections such as the motors built in the camera main body 1, and the local SRAM which temporarily stores data, etc. necessary for control of the operations of respective sections.

In addition, the digital still camera processor 104 further comprises an USB block 104-5 which enables the communication with an external device such as a personal computer via a USB terminal, a serial block 104-6 which enables serial communication with an external device such as a personal computer, a JPEG CODEC block 104-7 which performs a compression and expansion of a JPEG file, a resize block 104-8 which enlarges and shrinks a size of image data by interpolation, a TV signal display block 104-9 which converts the image data into a video signal so as to display the image data on a monitor screen 15, such as an LCD panel via an LCD driver 109, a memory card controller block 104-10 which performs control of a memory card (not shown) recording photographed image data, and an I2C block which performs serial communication between the acceleration sensor 67 and the CPU block 104-3. The memory card is inserted in a memory card slot (not shown). The data is always transmitted and received among these circuit elements and constituent sections mentioned above.

Outside of the processor 104, there are provided the SDRAM 103, the embedded memory 107, and the ROM 108 which stores various control programs, all of which are connected to the processor 104 via a bus line.

The SDRAM 103 temporarily stores the data when various processings are applied to the image data by the processor 104. The stored image data, for example, are RAW-RGD image data obtained from the CCD 101 via the front end IC 102 and subjected to the white balance setting and the Gamma setting performed by the CCD1 signal processing block 104-1, YUV image data subjected to brightness data and color difference data conversion by the CCD2 signal processing block 104-2, JPEG image data subjected to JPEG compression by the JPEG CODEC block 104-7, and the like.

The embedded memory 107 is a memory to store photographed image data even if no memory card is loaded in a memory card throttle.

The ROM 108 stores the control programs which are described in codes that may be read by a CPU block 104-3 within the digital still camera processor 104, as well as parameters for control.

When the power switch of the camera is turned on, the control programs are loaded into a main memory (not shown). The CPU block controls operations of respective sections according to the control programs and also temporarily stores data, etc. necessary for control in the local SRAM 104-4 within the digital still camera processor 104.

A rewritable flash ROM is used as the ROM 108, whereby the control program and parameters for control can be altered to facilitate version upgrade of the function.

The ultimate data obtained after various processings are performed is stored either in the embedded memory 107 or in the memory card serving as an external record medium, which is detachably inserted in the memory card slot.

The acceleration sensor 67 to detect the acceleration is connected to the digital still camera processor 104. The detailed illustration of the acceleration sensor 67 is made as above. The acceleration data detected by the acceleration sensor 67 is transmitted to the I2C block 104-11, and converted into a serial signal that the CPU block 104-3 can recognize. The serial signal including the acceleration data generated in the I2C block 104-11 is transmitted to the CPU block 104-3, whereby serial communication is performed between the acceleration sensor 67 and the CPU block 104-11.

The CPU block 104-3 performs arithmetic processing by using a threshold value and the calculation formula stored in the ROM108 illustrated later based on the aforementioned acceleration data, whereby there is generated an instruction signal to control an operation of a motor driver 62-5 illustrated later.

This instruction signal is transmitted to the motor driver 62-5, whereby the operation control of the motor driver 62-5 is performed.

The motor driver 62-5 is used to control the various motors in the lens unit 62.

The various motors are pulse motors controlled by a momentum or a current pulse. The output of the pulse motor (the torque) is increased accompanied by an increase in a current and a voltage applied to the motor and decreases accompanied by an increase of a pulse rate. Therefore, the torque of these motors can be controlled by adjusting the current, the voltage, and the pulse rate.

Figure 10:
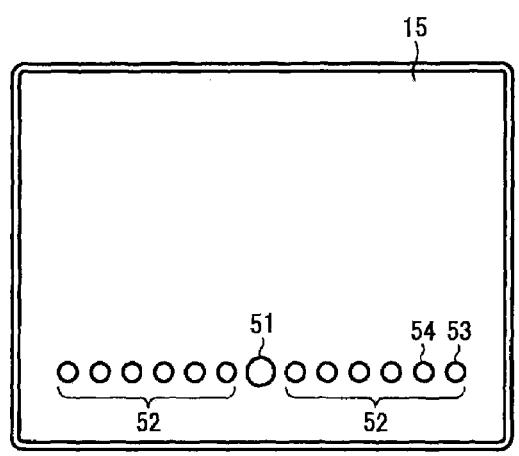
FIG. 10 is a diagrammatic sketch showing a screen display when a posture of the digital camera is determined, according to the first embodiment of the present invention.

Next, it will be illustrated hereinafter how the digital camera detects the posture according to the first embodiment of the present invention. FIG. 10 is a schematic diagram showing that the digital camera according to the first embodiment of the present invention detects the posture thereof. The digital camera 1 according to the first embodiment of the present invention has a function which enables the user to confirm whether the camera is placed horizontally with respect to a photographing direction. This function will be illustrated as follows. As shown in FIG. 10, the inclination of the digital camera 1 with respect to the horizontal direction is displayed by a plurality of circular marks on the monitor screen 15, based on the information obtained from the inclination detection sensor 67.

There are provided a plurality of circles overlapping the subject image, which are displayed on the monitor screen 15. Specifically, the inclination of the digital camera 1 with respect to the horizontal direction is indicated either by the color change of the plurality of circles or by the color change accompanied by a sound generated. As shown in FIG. 10, the plurality of circles are aligned horizontally at the lower part of the monitor screen 15.

When the composition image inclines, the inclination direction thereof and the amount of the inclination are indicated by the color change of twelve small circles provided at both sides of one central bigger circle 51.

For instance, when the composition image is inclined greatly to the right due to the inclination of the camera, the color of a circle at the right end 53 changes from white into green. When the amount of the inclination decreases, the color of a circle 54, adjacent to the circle 53 at the left side, changes from white into green while the color of the circle 53 reverts to white. When the user operates to reduce the amount of the inclination of the camera while observing the indicated state of the camera, the circle whose color turns into green approaches the center likewise. When the digital camera 1 is positioned horizontally by the user, the user can be informed of the state of the camera either by the color of the central big circle 53 turning into green or by such a color change of the circle 53 accompanied by a sound generated. It is optional for the user to decide whether to indicate such an inclination direction and an inclination amount on the monitor screen 15 or not.

Figure 11:
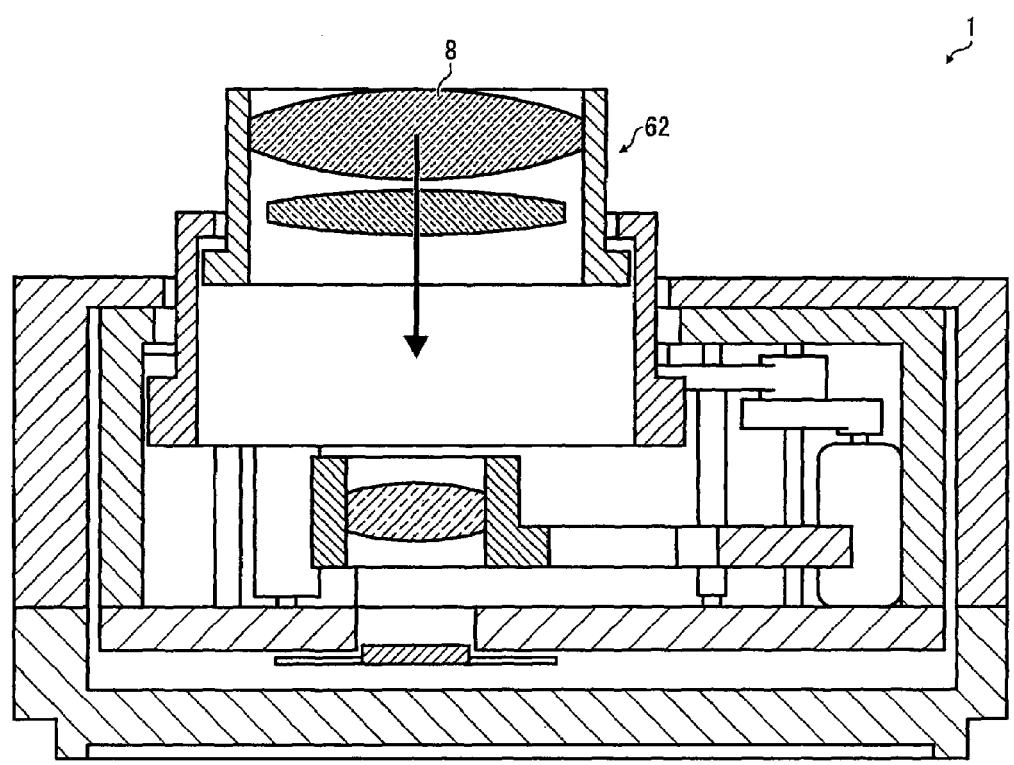
FIG. 11 is a sectional view showing a direction of the gravity working on the lens when the digital camera is in an upwards posture according to the first embodiment of the present invention.
Figure 12:
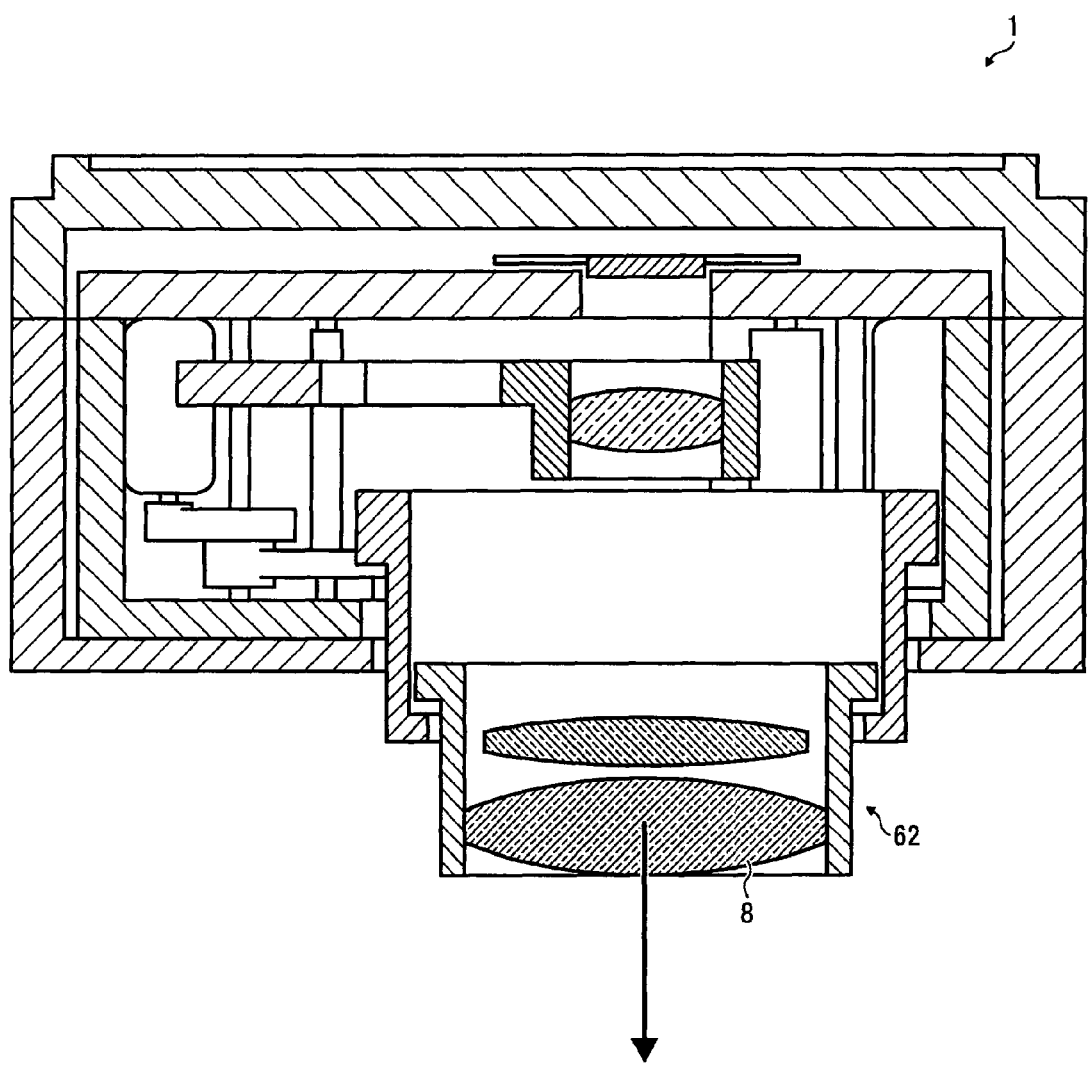
FIG. 12 is a sectional view showing a direction of the gravity working on the lens when the digital camera is in a downwards posture according to the first embodiment of the present invention.

Next, the control of the drive torque of the lens barrel and the various motors will be elaborated hereinafter. FIG. 11 is a sectional view showing a direction of the gravity working on the lens when the digital camera 1 is positioned upwards. FIG. 12 is a sectional view showing a direction of the gravity working on the lens when the digital camera 1 is positioned downwards.

As illustrated in FIG. 11 by the indication of an arrow, when the camera body 1 is placed upwards, the gravity working on the photographing lens 8, included in the lens barrel unit 62, facilitates the housing of the lens barrel unit 62. Therefore, compared with the case wherein the camera body 1 is placed horizontally, the torque required by the drive motors of the lens barrel unit 62 so as to extend the lens barrel unit 62 is larger. Conversely, compared with the case wherein the camera body 1 is placed horizontally, the torque required by the motors so as to house the lens barrel unit 62 is smaller.

As illustrated in FIG. 12 by the indication of an arrow, when the camera body 1 is placed downwards, the gravity working on the photographing lens 8, included in the lens barrel unit 62, facilitates the extension of the lens barrel unit 62. Therefore, compared with the case wherein the camera body 1 is placed horizontally, the torque required by the drive motors of the lens barrel unit 62 so as to extend the lens barrel unit 62 is smaller. Conversely, compared with the case wherein the camera body 1 is placed horizontally, the torque required by the motors so as to house the lens barrel unit 62 is larger.

To summarize the above, in terms of the extension of the lens barrel unit 62 when only the gravitational acceleration is at work, a maximum torque is required when the camera is placed upwards; a second largest torque is required when the camera is placed horizontally; and a minimum torque is required when the camera is placed downwards. In contrast, in terms of the housing of the lens barrel unit 62 when only the gravitational acceleration is at work, a maximum torque is required when the camera is placed downwards; a second largest torque is required when the camera is placed horizontally; and a minimum torque is required when the camera is placed upwards.

Meanwhile, sometimes, the user may start the operation of the camera while taking the camera body 1 out of a bag forcibly. Furthermore, the user also may photograph when he is doing an intense exercise or riding in a vehicle which shakes violently. In these cases, the acceleration applied to the camera body 1 becomes larger than the gravitational acceleration.

Consequently, the acceleration produced at the time may impede the operation of the lens barrel unit 62 more than the gravitational acceleration does. Therefore, a torque which is even larger than the aforementioned maximum torque is required.

As for the lens drive device having a photographing device such as the camera, besides the lens which moves in parallel with the optical axis, there also exists at least one lens group which moves in a direction which is not parallel with the optical axis, for example, which moves perpendicularly to the optical axis. In the lens drive device, the at least one lens group is referred to as a retractable lens. When in a non-photographing state, namely the lens barrel is housed or collapsed, the retractable lens is retracted sideways from the lens optical axis. When the lens barrel is extended, the retractable lens is placed onto the optical axis. A swing level, etc is fitted to the retractable lens. The retractable lens is susceptible to the acceleration because the retractable lens is advanced and retreated by rotating the swing level. Therefore, for the camera including the retractable lens, if an acceleration larger than the gravitational acceleration is applied to the camera in the middle of the movement of the retractable lens, the retractable lens contacts undesirably with other components inside the camera body 1. Consequently, the retractable lens may not be able to be moved normally. In such a case, the digital camera can not shift to the normal photographing state or a standstill state.

As illustrated heretofore, although the torque necessary to extend and house the lens barrel varies with the posture of the camera, a conventional camera always drives the lens barrel with a constant drive torque. More specifically, despite the fact that the maximum torque is only required to extend the lens barrel when the photographing lens is placed upwards and the acceleration which is at work is 1 G (no acceleration other than the gravitational acceleration is further applied), the conventional camera always extends the lens barrel unalterably with the maximum torque even when the photographing lens is placed in other postures. Likewise, despite the fact that the maximum torque is required to house the lens barrel when the photographing lens is placed downwards, the conventional camera always houses the lens barrel unalterably with the maximum torque even when the photographing lens is placed in other postures.

As illustrated heretofore, since the conventional camera always drives the lens barrel unalterably with the maximum drive torque even when a smaller drive torque will do, a superfluous amount of electricity is consumed. In addition, when the applied acceleration is larger than 1 G, the drive of the lens barrel may not be performed stably.

In order to solve the problems of the conventional camera, the camera according to an embodiment of the present invention is provided to adjust the torque necessary to drive the lens barrel according to the determined posture of the camera based on the acceleration applied to the camera.

Here, according to an embodiment of the present invention, the drive torque of a pulse motor, which is the motor to drive the lens barrel unit 62, is adjusted via adjusting a current, a voltage and a pulse rate applied to the motor. In other words, the current, the voltage and the pulse rate are parameters to adjust the torque of the pulse motor. The drive torque of the motor increases as the current or the voltage increases. Conversely, the drive torque of the motor decreases as the pulse rate increases. FIGS. 13 to 16 can be referred to for more details.

Figure 13:
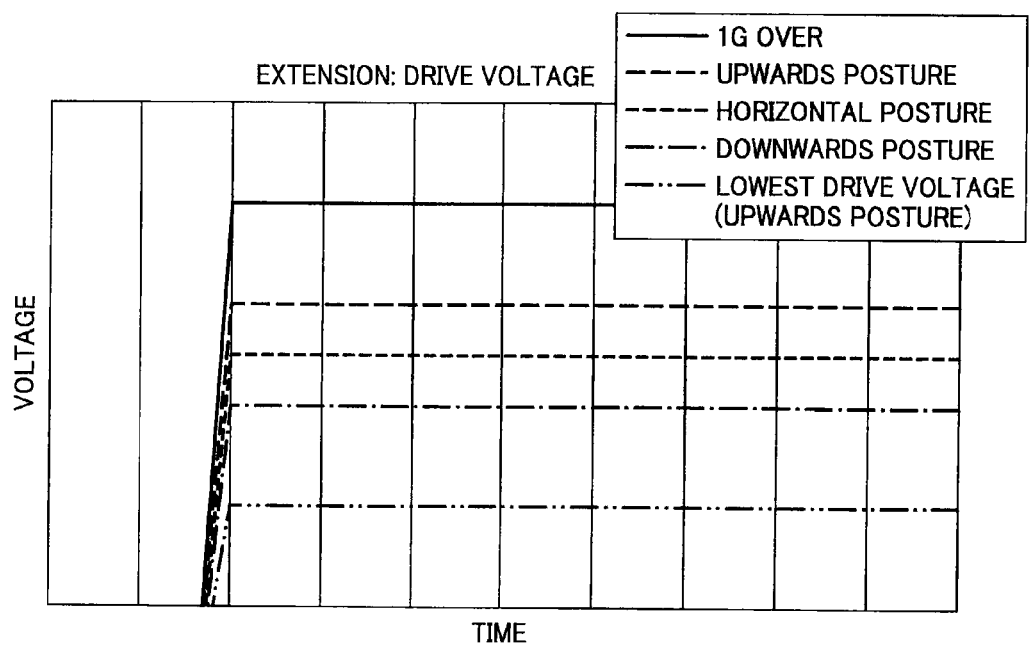
FIG. 13 is a graph illustrating a variation of the voltage with the lapse of time when the lens barrel is extended with the current and a pulse rate being constant corresponding to various postures of the digital camera according to the first embodiment of the present invention.
Figure 14:
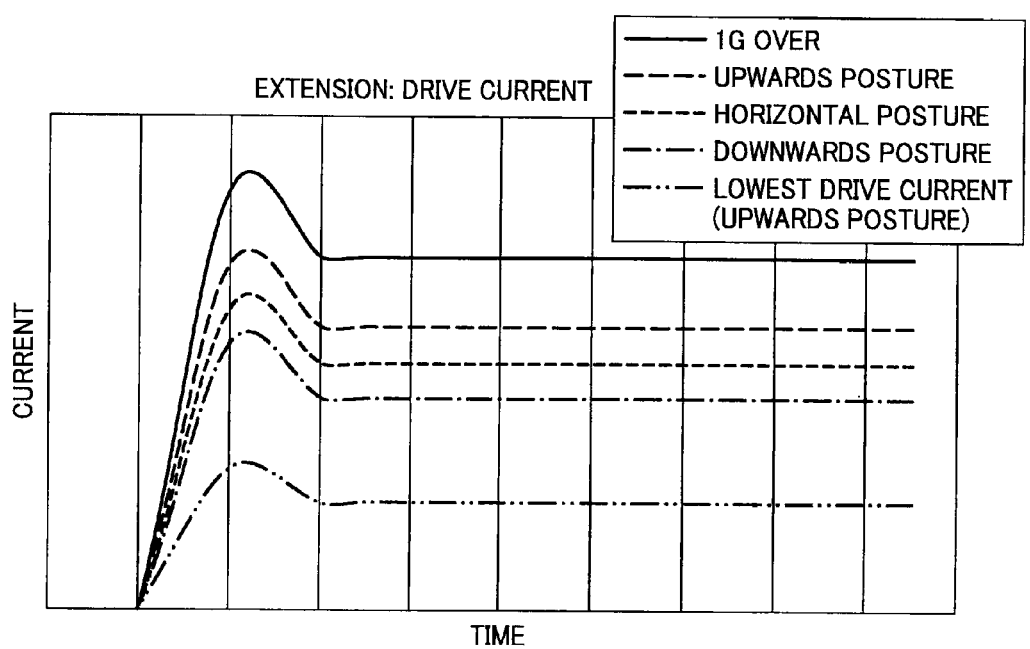
FIG. 14 is a graph illustrating a variation of the current with the lapse of time when the lens barrel is extended with the voltage and the pulse rate being constant corresponding to the various postures of the digital camera according to the first embodiment of the present invention.
Figure 15:
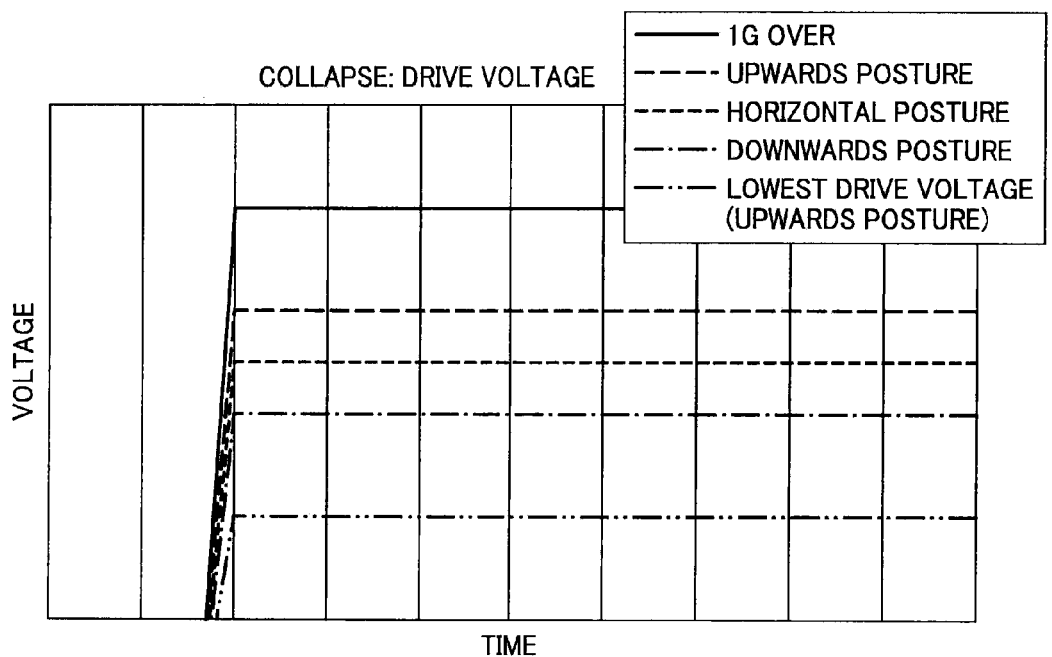
FIG. 15 is a graph illustrating a variation of the voltage with the lapse of time when the lens barrel is housed with the current and the pulse rate being constant corresponding to the various postures of the digital camera according to the first embodiment of the present invention.
Figure 16:
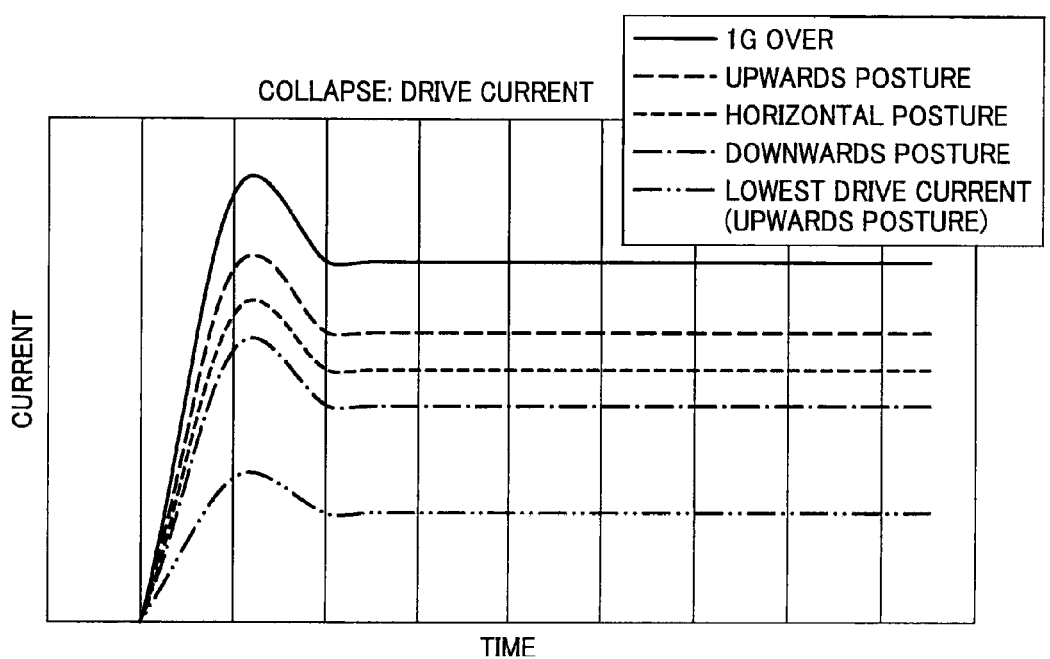
FIG. 16 is a graph illustrating a variation of the current with the lapse of time when the lens barrel is housed with the voltage and the pulse rate being constant corresponding to the various postures of the camera according to the first embodiment of the present invention.

FIG. 13 is a graph illustrating the variation of the voltage with the lapse of time when the lens barrel is extended with the current and the pulse rate being constant corresponding to various postures of the camera according to an embodiment of the present invention. FIG. 14 is a graph illustrating the variation of the current with the lapse of time when the lens barrel is extended with the voltage and the pulse rate being constant corresponding to various postures of the camera according to an embodiment of the present invention. FIG. 15 is a graph illustrating the variation of the voltage with the lapse of time when the lens barrel is collapsed with the current and the pulse rate being constant corresponding to various postures of the camera according to an embodiment of the present invention. FIG. 16 is a graph illustrating the variation of the current with the lapse of time when the lens barrel is collapsed with the voltage and the pulse rate being constant corresponding to various postures of the camera according to an embodiment of the present invention. All of FIGS. 13 to 16 illustrate the variation of the voltage or the current when the pulse is applied to the pulse motor.

As illustrated in FIG. 13, when the current and the pulse rate applied to the motor are constant, the torque for the extension of the lens barrel unit 62 is adjusted via adjusting the voltage applied to the motor.

In the case of extending the lens barrel unit 62, when only the gravitational acceleration (1 G) is at work, among the three postures of the camera (namely when the camera is placed upwards, horizontally and downwards, as illustrated in FIG. 13), the maximum torque is required when the camera is placed upwards. In this case, namely, the maximum voltage is required when the camera is placed upwards. Therefore, when the camera is upwards, in order to extend the lens barrel unit 62, compared with the voltage applied for the case wherein the camera is horizontal (hereinafter referred to as extension voltage for the horizontal posture), a higher voltage (hereinafter referred to as extension voltage for the upwards posture) is applied to the motor.

Similarly, when only the gravitational acceleration (1 G) is at work and the camera is downwards, the lens barrel unit 62 can be extended by the minimum torque, or the minimum voltage (hereinafter referred to as the extension voltage for the downwards posture). Therefore, compared with the voltage for the horizontal posture, a lower voltage is applied to the motor.

Meanwhile, in order to extend the lens barrel unit 62 when an acceleration is applied except the gravitational acceleration, for example, when the acceleration in the collapse direction of the lens barrel unit 62 exceeds 1 G (hereinafter the acceleration exceeding 1 G will be referred to as 1 G over), a higher voltage than that in the case where the camera is upwards is required. In other words, in the case of 1 G over, compared with the case of the upwards posture, an even higher voltage (hereinafter referred to as 1 G over extension voltage) is applied.

In addition, when the current and the pulse rate are constant as the case with the three postures mentioned above, for various postures, the voltages are set to be higher than the lowest voltage (in FIG. 13, referred to as a lowest drive voltage) to extend the lens barrel unit 62 with the case of the upwards posture respectively.

As illustrated in FIG. 14, when the voltage and the pulse rate applied to the motor are constant, the torque for the extension of the lens barrel unit 62 is adjusted via adjusting the current applied to the motor.

Specifically, for the case of 1 G, when the camera is upwards, the maximum torque is required for the extension. Therefore, in order to extend the lens barrel unit 62, compared with the current applied for the case wherein the camera is horizontal (hereinafter referred to as extension current for the horizontal posture), a larger current (hereinafter referred to as extension current for the upwards posture) is applied to the motor. Conversely, when the camera is downwards, since the minimum torque is sufficient for the extension, among the cases with the three postures, the smallest current (hereinafter referred to as the extension current for the downwards posture) is applied.

Similarly, in order to extend the lens barrel unit 62 with the downwards posture when an acceleration is applied except the gravitational acceleration, for example, when the acceleration in the collapse direction of the lens barrel unit 62 is 1 G over, an even larger torque than the one with the aforementioned case wherein the camera is upwards is required. In other words, in the case of 1 G over, compared with the case of the upwards posture, an even larger current (hereinafter referred to as 1 G over extension current) is applied.

In addition, when the voltage and the pulse rate are constant as the case with the three postures mentioned above, for various postures, the currents are set to be larger than the smallest voltage (in FIG. 14, referred to as the smallest drive current) to extend the lens barrel unit 62 with the case of the upwards posture respectively.

Meanwhile, in the case of 1 G, in order to house the lens barrel unit 62, when the camera is downwards, the maximum housing torque, or the highest voltage is required. Therefore, as illustrated in FIG. 15, in order to collapse the lens barrel unit 62 with the downwards posture, compared with the voltage applied in the case of the horizontal posture (hereinafter referred to as a collapse voltage for the horizontal posture), a higher voltage (hereinafter referred to as a housing voltage for the downwards posture) is applied to the motor. Conversely, in order to house the lens barrel unit 62 when the camera is upwards, the lens barrel unit 62 can be driven by the minimum torque or the minimum voltage. Therefore, a lower voltage is applied to the motor, compared with the voltage applied in the case of the horizontal posture.

In order to collapse the lens barrel unit 62 when an acceleration in the collapse direction of the lens barrel unit 62 exceeds 1 G (1 G over), a higher torque is required than the one with the case wherein the camera is downwards. Therefore, in the case of 1 G over, compared with the case of the downwards posture, an even higher voltage (hereinafter referred to as a 1 G over collapse voltage) is applied.

In addition, when the current and the pulse rate are constant as the case with the three postures mentioned above, for various postures, the voltages are set to be higher than a lowest voltage (in FIG. 15, referred to as a lowest drive voltage) to house the lens barrel unit 62 with the case of the downwards posture respectively.

As illustrated in FIG. 16, when the voltage and the pulse rate applied to the motor are constant, the torque for the housing of the lens barrel unit 62 is adjusted via adjusting the current applied to the motor.

Specifically, for the case of 1 G, when the camera is downwards, the maximum torque is required for the housing. Therefore, in order to house the lens barrel unit 62, compared with the current applied for the case wherein the camera is, horizontal (hereinafter referred to as a collapse current for the horizontal posture), a larger current (hereinafter referred to as a collapse current for the downwards posture) is applied to the motor. Oppositely, when the camera is upwards, since the minimum torque is sufficient for the housing, among the cases with the three postures, the smallest current (hereinafter referred to as a collapse current for the upwards posture) is applied.

In addition, in order to house the lens barrel unit 62 when the acceleration in the extension direction of the lens barrel unit 62 is 1 G over, an even larger torque is required than the one with the case wherein the camera is downwards. Therefore, in the case of 1 G over, compared with the case of the downwards posture, an even larger current (hereinafter referred to as a 1 G over collapse current) is applied.

In addition, when the voltage and the pulse rate are constant as the case with the three postures mentioned above, for various postures, the currents are set to be larger than the smallest current (in FIG. 13, referred to as a smallest drive current) to collapse the lens barrel unit 62 with the case of the downwards posture respectively.

As mentioned above, when the lens of the camera body 1 is placed in the gravity direction, the posture of the lens is referred to as "downwards". When the lens is placed horizontally, the posture of the lens is referred to as "horizontal". When the lens is placed in the direction opposite to the gravity direction, the posture of the lens is referred to as "upwards". However, in practice, the digital camera 1 is often placed at a posture other than the aforementioned three postures. For this case, the motor drive control is performed by an output selected from the torque corresponding to each of the aforementioned three postures.

The inclination angular range, calculated based on the detected result from the acceleration sensor 67, is 180 degrees. More specifically, when the camera is in the horizontal direction, the inclination angle is deemed to be 0 degree as a standard. Based on such a standard, when the camera is placed in the gravity direction, the inclination angle is deemed to be −90 degrees, while when the camera is placed in the direction opposite to the gravity direction, the inclination angle is deemed to be +90 degrees. When assuming the camera body 1 is inclined with respect to the horizontal direction by X degrees, an angular range of $-90 \leq X < -30$ is deemed to correspond to the downwards posture; an angular range of $-30 \leq X \leq 30$ is deemed to correspond to the horizontal posture; and an angular range of $30 < X \leq 90$ is deemed to correspond to the upwards posture.

Thus, the inclination angle with respect to the horizontal direction (0 degree) is determined based on an acceleration direction (direction of the vector) detected by the acceleration sensor, thereafter which angular range the inclination angle falls within is determined. The torque of the pulse motor that drives the lens of the lens barrel is adjusted by an output corresponding to the determined angular range. As a result, on the one hand, the superfluous power consumption can be suppressed, and on the other hand, the stable drive of the lens barrel can be secured.

Hereinafter the adjustment of the drive torque of the motor will be elaborated in the following preferred embodiments.

Figure 17:
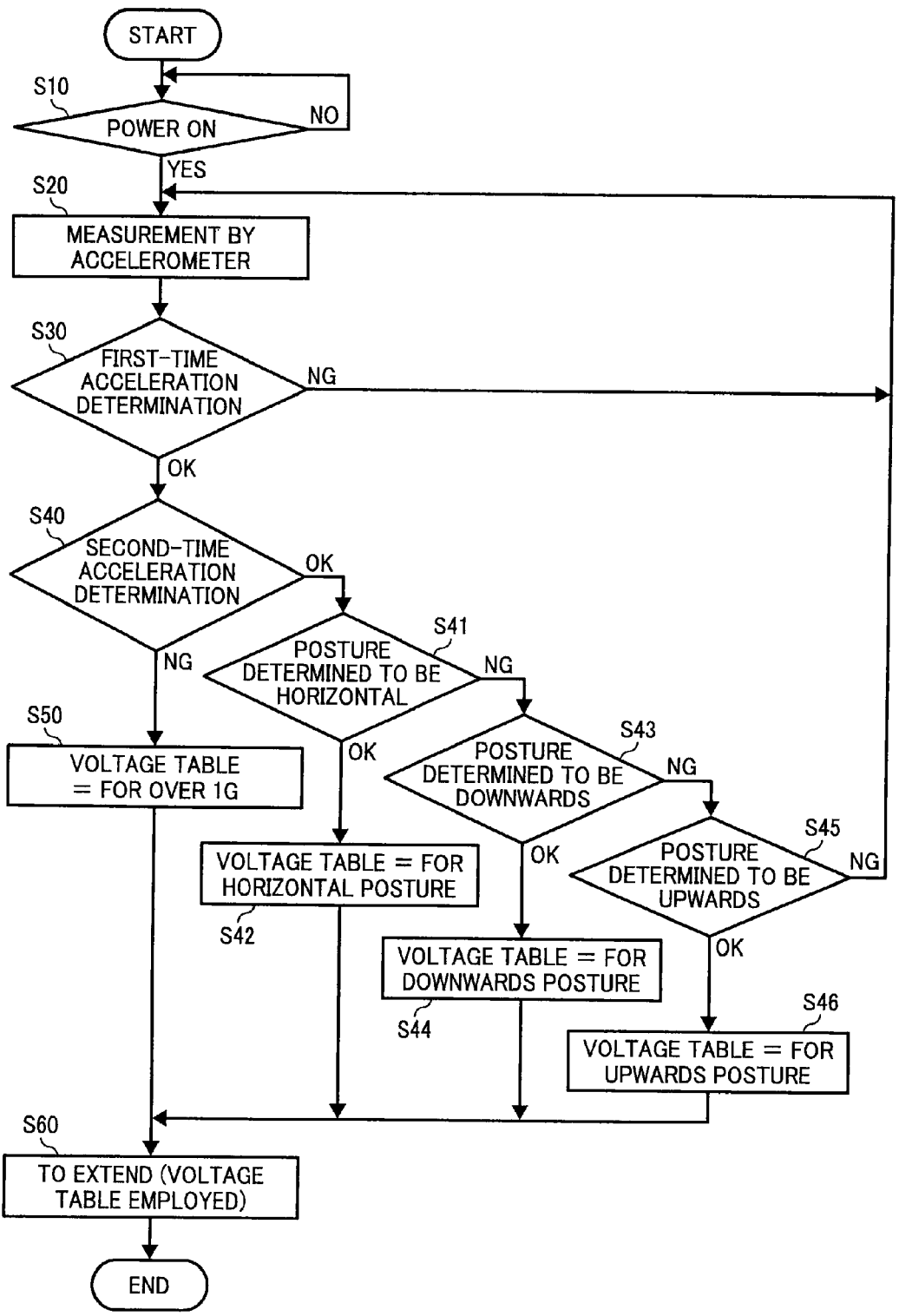
FIG. 17 is a flow chart illustrating a torque control performed to extend the lens barrel based on the voltage when the power is on according to the first embodiment of the present invention.

FIG. 17 is a flow chart illustrating a torque control performed to extend the aforementioned lens barrel based on a voltage when a power is on.

In the first embodiment, when the power is on, in order to perform an automatic extension of the lens barrel, the torque control is performed via varying the voltage applied to a pulse motor for the extension of the lens barrel with a posture, etc. of a camera body 1.

(A Case Wherein the 1 G Over Extension Voltage is Selected)

First of all, in step S10, it is confirmed that a power button 3 of the digital camera 1 is pressed to turn on electricity. When the camera is in a power-on state, in step S20, the acceleration applied to the camera body 1 is measured by the acceleration sensor 67. The acceleration measured by the acceleration sensor 67 is transmitted to the CPU block 104-3 via the I2C block 104-11 within the processor 104.

Then, in step S30, the CPU block 104-3 uses the program stored in the ROM 108 to perform a determination of whether the transmitted acceleration from the acceleration sensor 67 falls within a range of a secure extension of the lens barrel. (a first-time acceleration determination)

More specifically, the first-time acceleration determination is to determine whether the acceleration falls within a range between 0.8 G and 1.2 G. If the acceleration exceeds this range, the extension of the lens barrel is not performed. The reason is that an acceleration which is larger than 1.2 G impedes the lens drive. In particular, with respect to the lens drive device including the aforementioned retractable lens, as mentioned above, because the retractable lens is susceptible to the acceleration, the acceleration larger than 1.2 G applied impedes the operation of the retractable lens. If the retractable lens is driven unreasonably, components of the camera body 1 may be damaged. Consequently, the lens barrel which performs the extension may also be damaged or broken due to being overloaded. Considering the above, for the image pickup device such as the camera including the retractable lens, when the power is on, an output of an acceleration detector is detected. When the detected output of the acceleration detector exceeds a certain threshold, for example, 1.2 G, a shift from the housed or collapsed state of the retractable lens to the photographing state thereof is not performed. In other words, even if the above-mentioned acceleration is applied, the camera would not be in the power-on state. Namely, the retractable lens would not advance on the optical axis, whereby the damage caused by the application of the excessive acceleration can be prevented.

When the measured acceleration is equal to or smaller than 0.8 G, for example, the camera body 1 may be considered as being in a falling state. When in such a state, if the lens barrel is extended, the extended lens barrel bangs to the ground, etc. Consequently, the extension of the lens barrel in such a state may increase the likelihood of damaging the lens barrel. Considering this, the acceleration is repeatedly measured in the step S20 until the acceleration is determined to be within the range of between 0.8 G and 1.2 G, thereafter the extension of the lens barrel is performed.

In other words, for the image pickup device such as the camera including the retractable lens, when the measured acceleration is equal to or smaller than 0.8 G, a shift from the collapsed or housed state of the retractable lens the photographing state thereof is not performed, whereby the damage to the retractable lens, the lens barrel or the like, can be prevented.

As illustrated in FIGS. 13 and 15 hereinafter, the acceleration is divided into five stages. The lens drive motor is driven by the voltage corresponding to the acceleration of each stage. As in the above examples, when the acceleration is smaller than 0.8 G or larger than 1.2 G, the acceleration exceeds any stage of the five stages thereof. In these cases, the extension of the lens barrel is not performed until the acceleration is determined to be within the five stages. Thus, the damage to the lens drive device can be prevented and the stable drive can be secured.

When in the step S30, the acceleration is determined to be within the range of between 0.8 G and 1.2 G, in a following step S40, the CPU block 104-3 determines whether the camera body 1 is in a stationary state or not (a second-time acceleration determination).

More specifically, the second-time acceleration determination is performed to determine whether the acceleration is between 0.9 G and 1.1 G, which is considered to amount to a stationary state of the camera body 1 virtually.

When in this step S40, the camera body 1 is determined not being in the stationary state, in a following step S50, the CPU block 104-3 applies the 1 G over extension voltage, which is the largest drive voltage shown in the FIG. 13, to the motor driver 62-5, and selects a command signal from a voltage table of the ROM 108 in order to generate the largest torque.

Then, in a following step S60, the command signal to generate the 1 G over extension voltage is transmitted from the CPU block 104-3 to the motor driver 62-5. Based on the command signal, the motor driver 62-5 applies the 1 G over extension voltage to the pulse motors, which perform the extension of the lens barrel, whereby the pulse motors perform the extension by a torque corresponding to the 1 G over extension voltage.

A fourth range of the acceleration is a range wider than a second acceleration range illustrated hereinafter. Furthermore, the fourth range is also a range wherein when an acceleration, and further the gravitational acceleration are applied, both the extension and the collapse of the lens barrel can be performed securely. When the determined acceleration is within the fourth range, the lens barrel is driven by a torque or a motor output serving as a fourth output which is larger than a second output illustrated hereinafter. Meanwhile, a fifth range of the acceleration, being a range narrower than a third acceleration range illustrated hereinafter, is a range wherein when an acceleration besides the gravitational acceleration is applied, both the extension and the collapse of the lens barrel can be performed securely.

As illustrated above, even if the acceleration exceeding 1 G is applied to the camera body 1, the lens barrel can also be driven stably.

(A Case Wherein the Extension Voltage for the Upwards Posture is Selected)

The case will be illustrated with reference to FIG. 17 hereinafter. Since the steps of S10 to S30 in this case are identical with the steps in the above case of the 1 G over extension voltage, the illustration of these identical steps is omitted. The illustration starts from a step S40.

When in the step S40, the camera body 1 is determined being in the stationary state via the second-time acceleration determination, in a following step S41, a determination of whether the camera body 1 is in the horizontal posture is performed.

Here, whether the camera body 1 is in the horizontal posture or not is determined based on the direction of acceleration vector, detected by the acceleration sensor 67. As illustrated above, when the inclination angle of the camera body 1 is between −30 degrees to 30 degrees, the CPU block 104-3 determines that the camera is in a horizontal posture.

In a step S41, when the posture of the camera body 1 is determined to be horizontal, in a following step S42, the CPU block 104-3 selects a command signal to generate the extension voltage for the horizontal posture shown in FIG. 13 in the motor driver 62-5 from the voltage table stored in the ROM 108 and receives the command signal.

Then, in a following step S60, the command signal to generate the extension voltage for the upwards posture is transmitted from the CPU block 104-3 to the motor driver 62-5. Based on the command signal, the motor driver 62-5 applies the 1 G over extension voltage to the pulse motors, which perform the extension of the lens barrel, whereby the pulse motors perform the extension by a torque corresponding to the 1 G over extension voltage.

At this time, an acceleration range is considered to be a first acceleration range, and the torque of the motors or output is considered as the first output.

(A Case Wherein the Extension Voltage for the Downwards Posture is Selected)

The case will be illustrated with reference to FIG. 17 hereinafter. Since the steps of S10 to S40 in this case are identical with the steps in the above case of the extension voltage for the horizontal posture, the illustration of these identical steps is omitted. The illustration starts from a step S41.

In the step S41, when the camera body 1 18 determined not to be horizontal, in a following step S43, a determination of whether the camera body 1 is in the downwards posture is performed.

More specifically, when the inclination angle of the camera body 1 is between −90 degrees to −30 degrees, the CPU block 104-3 determines that the camera is in the downwards posture.

In a step S43, when the posture of the camera body 1 is determined to be downwards, in a following step S44, the CPU block 104-3 selects a command signal to generate the extension voltage for the downwards posture shown in FIG. 13 in the motor driver 62-5 from the voltage table stored in the ROM 108 and receives the command signal.

Then, in a following step S60, the command signal to generate the extension voltage for the downwards posture is transmitted from the CPU block 104-3 to the motor driver 62-5. Based on the command signal, the motor driver 62-5 applies the extension voltage for the downwards posture to the pulse motors, which perform the extension of the lens barrel, whereby the pulse motors perform the extension by a torque corresponding to the extension voltage for the downwards posture.

At this time, an acceleration range is considered to be a third acceleration range, which is larger than the above-mentioned first acceleration range. The torque of the motors or output is considered as a third output, which is smaller than the first output.

(A Case Wherein the Extension Voltage for the Upwards Posture is Selected)

The case will be illustrated with reference to FIG. 17 hereinafter. Since the steps of S10 to S41 in this case are identical with the steps in the case of the extension voltage for the downwards posture, the illustration of these identical steps is omitted. The illustration starts from a step S43.

When in the step S43, the camera body 1 is determined not to be in the downwards posture, in a following step S45, a determination of whether the camera body 1 is in the upwards posture is performed.

More specifically, when the inclination angle of the camera body 1 is between 30 degrees to 90 degrees, the CPU block 104-3 determines that the camera is in the upwards posture.

In the step S45, when the posture of the camera body 1 is determined to be upwards, in a following step S46, the CPU block 104-3 selects a command signal to generate the extension voltage of the upwards posture shown in FIG. 13, for the motor driver 62-5 from the voltage table stored in the ROM 108.

Then, in a following step S60, the command signal to generate the extension voltage for the upwards posture is transmitted from the CPU block 104-3 to the motor driver 62-5. Based on the command signal, the motor driver 62-5 applies the extension voltage for the upwards posture to the pulse motors, which perform the extension of the lens barrel, whereby the pulse motors perform the extension by a torque corresponding to the extension voltage for the upwards posture.

At this time, an acceleration range is considered to be the second acceleration range, which is larger than the above-mentioned first acceleration range. The torque of the motors or output is considered as a second output.

As illustrated above, superfluous power consumption can be suppressed by adjusting the voltage applied to the motor corresponding to the torque to extend the lens barrel required in each posture.

(A Case Wherein None of the Extension Voltages is Selected)

When in the step S45, the posture is not determined as upwards, after the return to the step S20, the acceleration determination is performed again. In the step S45, when the posture cannot be determined even after prescribed times of the determination, an error can be displayed on the LCD monitor screen 15.

Figure 18:
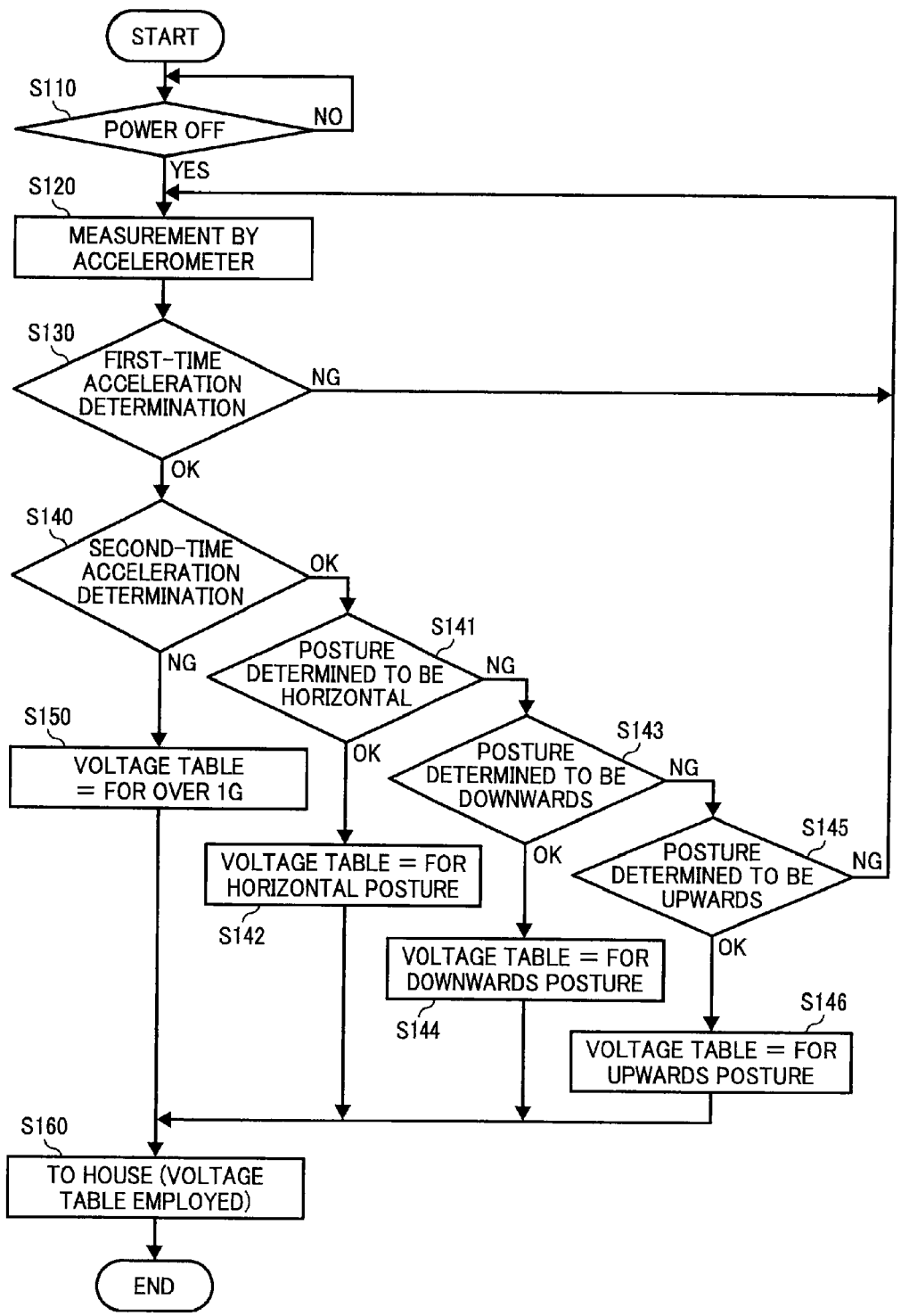
FIG. 18 is a flow chart illustrating a torque control performed to house the lens barrel based on the voltage when the power is off according to a second embodiment of the present invention.

A second embodiment of the present invention will be illustrated with reference to FIG. 18. FIG. 18 is a flow chart illustrating a torque control performed to house a lens barrel based on a voltage when the power is off.

In the second embodiment, when the power is off, in order to perform an automatic collapse of the lens barrel, the torque control is performed via varying the voltage applied to a pulse motor for the collapse of the lens barrel with a posture, etc. of a camera body 1.

(A Case Wherein the 1 G Over Housing Voltage is Selected)

First of all, in step S110, it is confirmed that a power button 3 of the digital camera 1 is pressed to turn off electricity. When the camera is in a power-off state, in a following step S120, the acceleration applied to the camera body 1 is measured by the acceleration sensor 67. Then, in a following step S130, the first-time acceleration determination is performed. Operations of the step 120 and the step 130 are omitted because the operations are the same as those of the step S20 and the step S30 in the first embodiment.

When the first-time acceleration determination is performed and determined that the acceleration falls within a range between 0.8 G and 1.2 G, in a following step S140, the CPU block 104-3 determines whether the camera body 1 is in the stationary state or not (the second-time acceleration determination). Since the second-time acceleration determination is the same as that in the step S40 of the first embodiment, the illustration thereof is omitted.

When in this step S140, the camera body 1 is determined not being in the stationary state, in a following step S150, the CPU block 104-3 selects the command signal from the voltage table of the ROM 108 in order to generate the 1 G over housing voltage, shown in the FIG. 15, applied to the motor driver 62-5.

Then, the command signal to generate the 1 G over housing voltage is transmitted from the CPU block 104-3 to the motor driver 62-5. Based on the command signal, the motor driver 62-5 applies the 1 G over housing voltage to the pulse motors, which perform the drive of the lens barrel, whereby the pulse motors perform the housing by a torque corresponding to the 1 G over housing voltage.

As illustrated above, even the acceleration exceeding 1 G is applied to the camera body 1, the lens barrel can also be driven stably.

(A Case Wherein the Housing Voltage for the Upwards Posture is Selected)

Hereinafter there will be illustrated a case wherein the housing voltage for the upwards posture is selected. Since the steps of S110 to S130 in this case are identical with the steps in the above case of the 1 G over housing voltage, the illustration of these identical steps is omitted. The illustration starts from a step S140.

When in the step S140, the camera body 1 is determined being in the stationary state via the second-time acceleration determination, in a following step S141, a determination of whether the camera body 1 is in the horizontal posture is performed.

In the step S141, when the posture of the camera body 1 is determined to be horizontal, in a following step S142, the CPU block 104-3 selects a command signal to generate the housing voltage for the horizontal posture shown in FIG. 15 for the motor driver 62-5 from the voltage table stored in the ROM 108 and is configured to receive the command signal.

Then, in a following step S160, the command signal to generate the housing voltage for the horizontal posture is transmitted from the CPU block 104-3 to the motor driver 62-5. Based on the command signal, the motor driver 62-5 applies the housing voltage for the horizontal posture to the pulse motors, which perform the housing of the lens barrel, whereby the pulse motors perform the housing by a torque corresponding to the housing voltage for the horizontal posture.

At this time, an acceleration range is considered to be a first acceleration range, and the torque of the motors or output is considered as the first output.

(A Case Wherein the Housing Voltage for the Downwards Posture is Selected)

There will be illustrated the case wherein the housing voltage for the downwards posture is selected. Since the steps of S110 to S140 in this case are identical with the steps in the above case of the housing voltage for the horizontal posture, the illustration of these identical steps is omitted. The illustration starts from a step S141.

When in the step S141, the camera body 1 is determined not to be in the stationary state, in a following step S143, a determination of whether the camera body 1 is in the downwards posture is performed. Since an operation in the step S143 is the same as that in the step S43 of the first embodiment, the operation in the step S143 is omitted.

In the step S143, when the posture of the camera body 1 is determined to be downwards, in a following step S144, the command signal to generate the housing voltage for the downwards posture, shown in the FIG. 15, is transmitted from the CPU block 104-3 to the motor driver 62-5. Based on the command signal, the motor driver 62-5 applies the housing voltage for the downwards posture to the pulse motors, which drive the lens barrel, whereby the pulse motors perform the housing by a torque corresponding to the housing voltage for the downwards posture.

At this time, an acceleration range is considered to be a second acceleration range, which s8 larger than the above-mentioned first acceleration range. The torque of the motors or output is considered as a second output, which is larger than the first output.

(A Case Wherein the Housing Voltage for the Upwards Posture is Selected)

There will be illustrated the case wherein the housing voltage for the upwards posture is selected. Since the steps of S110 to S141 in this case are identical with the steps in the above case of the housing voltage for the downwards posture, the illustration of these identical steps is omitted. The illustration starts from a step S143.

When in the step S143, the camera body 1 is not determined to be in the downwards posture, in a following step S145, a determination of whether the camera body 1 is in the upwards posture is performed. Since an operation in the step S145 is the same as that in the step S45 of the first embodiment, the operation in the step S145 is omitted.

In the step S145, when the posture of the camera body 1 is determined to be upwards, in a following step S146, the CPU block 104-3 selects a command signal to generate the housing voltage for the upwards posture shown in FIG. 15 in the motor driver 62-5 from the voltage table stored in the ROM 108.

Then, in a following step S160, the command signal to generate the housing voltage for the upwards posture is transmitted from the CPU block 104-3 to the motor driver 62-5. Based on the command signal, the motor driver 62-5 applies the housing voltage for the upwards posture to the pulse motors, which perform the housing of the lens barrel, whereby the pulse motors perform the housing by a torque corresponding to the housing voltage for the upwards posture.

At this time, an acceleration range is considered to be a third acceleration range, which is smaller than the above-mentioned first acceleration range. The torque of the motors or output is considered as a third output, which is smaller than the first output.

As illustrated above, superfluous power consumption can be suppressed by varying the voltage applied to the motor corresponding to the torque of the lens barrel required in each posture.

(A Case Wherein None of the Housing Voltages is Selected)

When in the step S145, the posture is not determined as upwards, after the return to the step S120, the acceleration determination is performed again. In the step S145, when the posture cannot be determined even after prescribed times, an error can be displayed on the LCD monitor screen 15.

Figure 19:
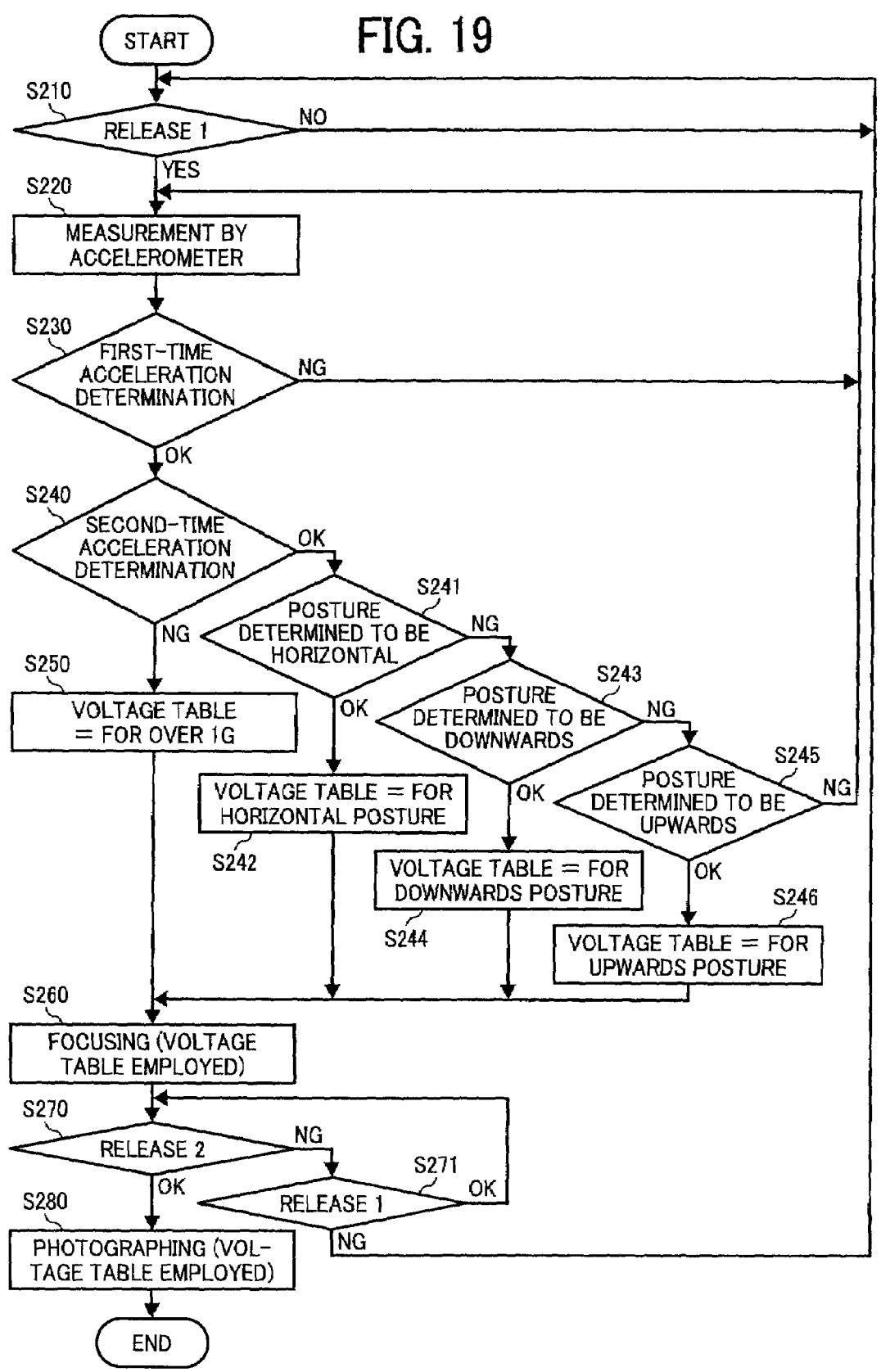
FIG. 19 is a flow chart illustrating a torque control performed for an automatic focusing, based on the voltage when the power is on according to a third embodiment of the present invention.

A third embodiment of the present invention will be illustrated with reference to FIG. 19. FIG. 19 is a flow chart illustrating a torque control performed for an automatic focusing, based on a voltage when the power is on.

In the third embodiment, when the lens barrel is driven automatically, in order to perform an automatic focusing, the voltage applied to a pulse motor for the drive of the lens barrel is varied with a posture, etc. of the camera body 1. The control of the torque to drive the lens barrel will be illustrated hereinafter.

(A Case Wherein a 1 G Over Drive Voltage is Selected)

First of all, in a step S210, it is determined whether a shutter button 2 of the digital camera 1 is pressed halfway (hereinafter also referred to as release 1) or not. When the shutter button 2 is pressed halfway, in a following step S220, the acceleration applied to the camera body 1 is measured by the acceleration sensor 67. Since at this time, the operation of the step S220 is the same as those of the step S20 in the first embodiment and the step S120 in the second embodiment, the illustration of the step S220 is omitted.

Then in a step S230, a first-time acceleration determination is performed based on the measured acceleration obtained from the acceleration sensor 67. Since the first-time acceleration determination is the same as those of the step S30 in the first embodiment and the step S130 in the second embodiment, the illustration thereof is omitted.

When in the step S230, the acceleration is determined to be within the range of between 0.8 G and 1.2 G, in a following step S240, the CPU block 104-3 determines whether the camera body 1 is in the stationary state or not (the second-time acceleration determination). Since the second-time acceleration determination is the same as those of the step S40 in the first embodiment and the step S140 in the second embodiment, the illustration thereof is omitted.

When in this step S240, the camera body 1 is determined not being in the stationary state, in a following step S250, the CPU block 104-3 selects a command signal from a voltage table of the ROM 108 in order to generate the 1 G over extension voltage, illustrated in the FIG. 13 or the 1 G over housing voltage, illustrated in the FIG. 15 to the motor driver 62-5. Which voltage is generated depends on to which direction the lens barrel needs to be moved for the automatic focusing. Here, the lens barrel can be moved either in the extension direction of the lens barrel or in the housing direction of the lens barrel (collectively referred to as a 1 G over drive voltage).

Then, in this step S260, the command signal to generate the 1 G over drive voltage is transmitted from the CPU block 104-3 to the motor driver 62-5. Based on the command signal, the motor driver 62-5 applies the 1 G over drive voltage to the pulse motors, which perform the drive of the lens barrel, whereby the pulse motors perform the drive by a torque corresponding to the 1 G over drive voltage so as to execute focusing.

As illustrated above, even if the acceleration exceeding 1 G is applied to the camera body 1, the lens barrel can also be driven stably.

In a next step S270, the shutter button 2 is further pressed consecutively after being pressed halfway (hereinafter also referred to as a release 2), whereby in a following step S280, a photographing of a subject is performed.

In the step S270, when the shutter button 2 is not further pressed consecutively after being pressed halfway, in a step S271, there is performed a determination of whether the state of the release 1 is being secured or not.

In the step S271, when it is determined that the state of the release 1 is being secured, a return to the step S270 is performed to determine whether the operation of the release 2 is performed or not. When it is determined that the state of the release 1 is not being secured, a return to the step S210 is performed so as to execute an operation repeatedly until being in the state of release 1 is determined.

(A Case Wherein the Drive Voltage for the Horizontal Posture is Selected)

Hereinafter, the case will be illustrated wherein the drive voltage for the horizontal posture is selected. Since some steps in this case are the same as those steps of S210 to S230 when the 1 G over drive voltage is selected, the illustration is omitted. The illustration starts from a step S240.

In the step S240, when the camera body 1 is determined being in the stationary state via the second-time acceleration determination, in a following step S241, a determination of whether the camera body 1 is in the horizontal posture is performed. Since the operation performed in the step S241 is the same as those in the step S41 in the first embodiment and the step S141 in the second embodiment, the illustration is omitted.

In the step S241, when the posture of the camera body 1 is determined to be horizontal, in a following step S242, the CPU block 104-3 selects a command signal to generate the extension voltage for the horizontal posture shown in FIG. 13, or the housing voltage for the horizontal posture shown in FIG. 15, (collectively referred to as a drive voltage for the horizontal posture) in the motor driver 62-5 from the voltage table stored in the ROM 108.

Then, in the step S260, the command signal to generate the drive voltage for the horizontal posture is transmitted from the CPU block 104-3 to the motor driver 62-5. Based on the command signal, the motor driver 62-5 applies the drive voltage for the horizontal posture to the pulse motors, which perform the drive of the lens barrel, whereby the pulse motors perform the drive by a torque corresponding to the drive voltage for the horizontal posture so as to execute focusing.

At this time, an acceleration range is considered to be a first acceleration range, and the torque of the motors or output is considered as the first output.

Since the operations from the step S270 are the same as those aforementioned when the 1 G over drive voltage is selected, the illustration is omitted.

(A Case Wherein the Drive Voltage for the Downwards Posture is Selected)

Hereinafter, the case will be illustrated wherein the drive voltage for the downwards posture is selected. Since some steps in this case are the same as those steps of S210 to S240 when the drive voltage for the horizontal posture is selected) the illustration is omitted. The illustration starts from a step S241.

In the step S241, when the camera body 1 is determined not to be in the stationary state, in a following step S248, a determination of whether the camera body 1 is in the downwards posture is performed. Since the operation performed in the step S243 is the same as those in the step S43 in the first embodiment and the step S143 in the second embodiment, the illustration is omitted.

In the step S243, when the posture of the camera body 1 is determined to be downwards, in a following step S244, the command signal to generate the extension voltage for the downwards posture shown in FIG. 13 or the housing voltage for the downwards posture shown in FIG. 15, (collectively referred to as a drive voltage for the downwards posture) in the motor driver 62-5, is transmitted from the CPU block 104-3 to the motor driver 62-5. Based on the command signal, the motor driver 62-5 applies the drive voltage for the downwards posture to the pulse motors, which perform the drive of the lens barrel, whereby the pulse motors perform the drive by a torque corresponding to the drive voltage for the downwards posture so as to execute focusing.

As to when to extend the lens barrel in the downwards posture, an acceleration range is considered to be a third acceleration range, which is larger than the above-mentioned first acceleration range. The torque of the motors or output is considered as a third output, which is smaller than the first output. In contrast, as to when to house the lens barrel in the downwards posture, an acceleration range is considered to be the second acceleration range, which is larger than the above-mentioned first acceleration range. The torque of the motors or output is considered as a second output, which is larger than the first output.

Since the operations from the step S270 are the same as those aforementioned when the 1 G over drive voltage is selected, the illustration is omitted.

(A Case Wherein the Drive Voltage for the Upwards Posture is Selected)

Hereinafter, the case will be illustrated wherein the drive voltage for the upwards posture is selected. Since some steps in this case are the same as those steps of S210 to S241 when the drive voltage for the downwards posture is selected, the illustration is omitted. The illustration starts from a step S243.

In the step S243, when the camera body 1 is determined not to be in the downwards posture, in a following step S245, a determination of whether the camera body 1 is in the upwards posture is performed. Since the operation performed in the step S245 is the same as those in the step S45 in the first embodiment and the step S145 in the second embodiment, the illustration is omitted.

In the step S245, when the posture of the camera body 1 is determined to be upwards, in a following step S246, the CPU block 104-3 selects a command signal to generate the extension voltage for the upwards posture shown in FIG. 13 or the housing voltage for the upwards posture shown in FIG. 15, (collectively referred to as a drive voltage for the upwards posture) in the motor driver 62-5, from the voltage table stored in the ROM 108 and receives the command signal.

Then, in the step S260, the command signal to generate the drive voltage for the upwards posture is transmitted from the CPU block 104-3 to the motor driver 62-5. Based on the command signal, the motor driver 62-5 applies the drive voltage for the upwards posture to the pulse motors, which perform the drive of the lens barrel, whereby the pulse motors perform the drive by a torque corresponding to the drive voltage for the upwards posture so as to execute focusing.

As to when to extend the lens barrel in the upwards posture, an acceleration range is considered to be a second acceleration range, which is larger than the above-mentioned first acceleration range. The torque of the motors or output is considered as a second output, which is larger than the first output. In contrast, when to house the lens barrel in the upwards posture, an acceleration range is considered to be the third acceleration range, which is larger than the above-mentioned first acceleration range. The torque of the motors or output is considered as a third output, which is smaller than the first output.

Since the operations from the step S270 are the same as those aforementioned when the 1 G over drive voltage is selected, the illustration is omitted.

As illustrated above, superfluous power consumption can be suppressed by adjusting the voltage applied to the motor corresponding to the torque to drive the lens barrel required in each posture.

(A Case Wherein None of the Extension Voltages is Selected)

When in the step S245, the posture is not determined as upwards, after the return to the step S220, the acceleration determination is performed again. In the step S245, when the posture cannot be determined even after prescribed times of the determination, an error can be displayed on the LCD monitor screen 15.

Although in the above three embodiments, the torque control of the pulse motors is performed via varying the voltages respectively, the torque control of the pulse motors can also be performed via varying the currents respectively or varying the pulse rates respectively.

In recent years, many cameras are provided with a camera-shake correction unit. The camera-shake correction unit can eliminate an image shake via moving some lenses and an image pickup element, etc. corresponding to the camera shake, after the camera shake is detected by a built-in acceleration sensor. Since the lens drive device and the image pickup device according to an embodiment of the present invention are provided with the acceleration detector, an output signal of this acceleration detector can serve as a necessary acceleration detection signal for the camera-shake correction device. In other words, the acceleration detector according to an embodiment of the present invention, can also be used to detect the acceleration for the camera-shake correction.

Next, a fourth embodiment of the present invention will be illustrated with reference to FIGS. 20 and 21. While a zoom lens is moved from a wide-angle end to a telephoto end, the movement direction of the lens may be undesirably changed to an opposite direction. For example, while the lens is extended from the wide-angle end to the telephoto end by the zoom lens drive device, the movement direction of the lens may be switched and the lens may be driven undesirably in a collapse direction. Meanwhile, while the lens is collapsed from the telephoto end to the wide-angle end, the movement direction of the lens may be switched and the lens may be driven undesirably in an extension direction. Considering the above, even when a posture of the zoom lens drive device remains unchanged, a force required for the drive of the lens varies before and behind the lens movement direction switching position. In this fourth embodiment of the present invention, when the posture of the zoom lens drive device remains unchanged, the force required for the drive of the lens is varied before and behind the lens movement direction switching position, whereby superfluous power consumption is eliminated, and a stable drive of the lens barrel is secured.

FIG. 20B illustrates a case wherein the lens is moved from the wide-angle end to the telephoto end, wherein approximately a first half of the movement is the extension movement while a second half of the movement is switched to the collapse movement. FIG. 20C illustrates a case wherein the lens is moved from the telephoto end to the wide-angle end, which is in contrast to the former case. In FIGS. 20B and 20C, a vertical axis represents a voltage. As illustrated, a bold dashed line represents variances in the lens drive voltage when an acceleration exceeding 1 G is at work, while a thin dashed line represents variances in the lens drive voltage when the posture of the zoom lens is downwards. A bold solid line represents variances in the lens drive voltage when the posture of the zoom lens is horizontal, while a thin solid line represents variances in the lens drive voltage when the posture of the zoom lens is upwards.

FIG. 20B illustrates the case of the horizontal posture by the bold solid line. Since the force required for the lens drive does not vary even when the lens movement direction is switched, the lens drive voltage can remain constant as a standard voltage. An output of the lens drive device driven by this standard voltage is referred to as a first output. When the acceleration larger than 1 G is at work, the lens is driven by an output larger than the first output, (referred to as a second output hereinafter), irrespective of the lens movement being the extension movement or the collapse movement, as illustrated in the aforementioned embodiments. The second output is illustrated by the bold dashed line. When the lens is in the downwards posture, as illustrated by the thin dashed line, since the lens extension movement can be performed by a small force, the lens is thus driven by a smaller output than the first output. Then, however, immediately preceding the switch of the lens movement direction, the output is switched to an output larger than the first output and smaller than the second output, whereby the lens is driven. When the lens is in the upwards posture, as illustrated by the thin solid line, since the lens extension movement cannot be performed unless by a large force, the lens is thus driven by an output larger than the first output and smaller than the second output. Then, however, after the lens movement direction is switched, the output is switched to an output smaller than the first output, whereby the lens is driven. As illustrated above, when the lens is in the upwards posture, in order to stabilize the lens movement, the lens is driven by the large output until after the lens movement direction switch position is passed.

FIG. 20C illustrates a case wherein the lens is moved from the telephoto end to the wide-angle end. How an output of the lens drive device varies in this case is in contrast to how the output does in the above case illustrated by FIG. 20B. More specifically, when the lens is in the upwards posture, the lens extension movement is performed by an output larger than the first output and smaller than the second output, which is referred to as a fourth output. Until after the lens movement direction is switched, the output is switched to an output smaller than the first output, whereby the lens is collapsed. Meanwhile, when the lens is in the downwards posture, the lens is extended by an output smaller than the first output. Then, immediately preceding the switch of the lens movement direction to perform the collapse, the output is switched to an output larger than the first output and smaller than the second output, whereby the lens is driven.

Corresponding to the above various cases, the predetermined voltages applied to the lens drive device are defined as follows:

T1a: at the time of extension, in the horizontal posture
T2a: at the time of extension, the acceleration at work exceeding 1 G
T3a: at the time of extension, in the downwards posture
T4a: at the time of extension, in the upwards posture
T1b: at the time of collapse, in the horizontal posture
T2b: at the time of collapse, the acceleration at work exceeding 1 G
T3b: at the time of collapse, in the downwards posture
T4b: at the time of collapse, in the upwards posture As indicated in FIGS. 20 and 20C, for the time of extension, a relationship of the predetermined voltages T1a, T2a, T3a and T4a is T2a>T4a>T1a>T3a. In contrast, for the time of collapse, a relationship of the predetermined voltages T1b, T2b, T3b and T4b is T2b>T3b>T1b>T4b.

The posture of the lens, namely being horizontal, upwards or downwards, and whether the acceleration exceeds 1 G, can be detected by the aforementioned acceleration sensor, serving as an acceleration detection section. In addition, on which position the lens movement direction is switched can be known beforehand in a lens designing stage. Since the lens position can be measured in real-time either by counting the drive pulse of the pulse motor which drives the lens in order to move the lens, or by an encoder or other lens position detection section, the position wherein the lens movement direction is switched can be detected by the measured result. Therefore, in the course of the lens being moved, it can be discriminated to which position the extension movement is performed and to which position the collapse movement is performed. The discrimination signal is obtained from a lens drive direction discrimination section which discriminates the drive direction of the lens drive device. The relationship of this discrimination signal, the posture determination result based on the acceleration detection result obtained from the acceleration detection section, and the aforementioned predetermined voltage can be summarized as in the FIG. 20A. "Voltage table" in FIG. 20A is a table prepared beforehand and selected corresponding to the lens posture, wherein the voltages applied to the lens drive device defined as above are set when to extend the lens and to collapse the lens. When the posture is horizontal, T1 in the voltage table is selected; when the acceleration exceeds 1 G, T2 in the voltage table is selected; when the posture is upwards, T3 in the voltage table is selected; and when the posture is downwards, T4 in the voltage table is selected.

Next, the fourth embodiment of the present invention will be further illustrated with reference to FIG. 21. In FIG. 21, some steps, such as the measurement performed by the accelerometer (S310), the first-time acceleration determination (S320), the second-time acceleration determination (S330), the determination of whether the posture is horizontal (S331), the determination of whether the posture is downwards (S332), and the determination of whether the posture is upwards (S333), are the same as those in the aforementioned embodiments. For example, when the shutter button 2 is pressed halfway, in the step S310, the acceleration applied to the camera body 1 is measured by the acceleration sensor. Then in the step S320, the first-time acceleration determination is performed based on the measured acceleration obtained from the acceleration sensor. When the acceleration is determined to be within the range of between 0.8 G and 1.2 G, in the following step S330, the CPU block 104-3 performs the second-time acceleration determination in order to determine whether the camera body 1 is in the stationary state or not.

When in the step S330, the camera body 1 is determined not being in the stationary state, it is determined that an acceleration and also the gravitational acceleration are applied to the camera body and the lens can be driven at the time. Then in the following step S340, the CPU block 104-3 selects the voltage table T2, which is applicable to the case of "1 G over", as indicated in FIG. 20A, from the voltage table of the ROM 108, whereby the drive voltage for the extension direction is set to be T2a and the drive voltage for the collapse direction is set to be T2b by the lens drive device. When the posture is horizontal, an acceleration pattern is defined as a first pattern, which will be illustrated hereinafter. In the step S330, when the acceleration is determined to be over 1 G, an acceleration pattern is defined as a second pattern. With regard to the case of the second pattern, the lens drive device is driven by an output larger than the operation output to extend and collapse the lens in the case of the first pattern.

In the step S330, when it is determined being in the stationary state, in the following step 9331, a further determination of whether the posture is horizontal or not is performed, based on the output signal obtained from the acceleration sensor. When the posture is determined to be horizontal, in the step S341, T1, being the voltage table for the horizontal posture, is selected from the voltage table of the ROM 108, whereby the drive voltage for the extension direction is set to be T1a and the drive voltage for the collapse direction is set to be T1b (=T1a) by the lens drive device. As mentioned above, the acceleration pattern corresponding to this horizontal posture is defined as the aforementioned first pattern. The drive voltages T1a and T1b, being standard output, are considered as the first output.

In the step S331, when the posture is determined not to be horizontal, in the step S332, the determination of whether the posture is downwards is performed, based on the output signal obtained from the acceleration detector. When the posture is determined to be downwards, in the step S342, T3, being the voltage table for the downwards posture, is selected from the voltage table of the ROM 108, whereby the drive voltage for the extension direction is set to be T3a and the drive voltage for the collapse direction is set to be T3b by the lens drive device. The acceleration pattern corresponding to this downwards posture is defined as a third pattern. Compared with the first output, the operation output for extension is decreased and the operation output for collapse is increased. Namely, as indicated in FIG. 20B, the voltage T3a, which is lower than both the voltage T1a and the voltage T1b, serves as the voltage for extension. When the collapsed state is shifted to, this voltage is increased to the voltage T3b, which is higher than both the voltage T1a and T1b.

In the step S332, when the posture is determined not to be downwards, in the step S333, the determination of whether the posture is upwards is performed, based on the output signal obtained from the acceleration detector. When the posture is determined to be upwards, in the step S343, T4, being the voltage table for the upwards posture, is selected from the voltage table of the ROM 108, whereby the drive voltage for the extension direction is set to be T4a and the drive voltage for the collapse direction is set to be T4b by the lens drive device. The acceleration pattern corresponding to this upwards posture is defined as a fourth pattern. Compared with the first output, the operation output for extension is increased and the operation output for collapse is decreased. Namely, as indicated in FIG. 20B, the voltage T4a, which is higher than both the voltage T1a and the voltage T1b, serves as the voltage for extension. When the collapsed state is shifted to, this voltage is decreased to the voltage T4b, which is lower than both the voltage T1a and T1b.

The CPU block 104-3 is a function block, which is capable of performing the acceleration determination and the posture determination. In addition, the CPU block 104-3 has an acceleration discrimination section. When the posture is determined based on the output of the acceleration sensor, the acceleration pattern is discriminated among the aforementioned four patterns based on the posture determination result.

The camera is provided with a zoom key, serving as one of a plurality of operating sections. The zoom key has an operating member to drive the lens from the wide-angle end to the telephoto end, as well as an operating member to drive the lens from the telephoto end to the wide-angle end. By operating the zoom key, the camera user can continuously vary a power of the camera from the wide-angle end to the telephoto end or from the telephoto end to the wide-angle end. In FIG. 21, the zoom key operation is referred to such a variable power operation. According to the zoom key operation, the lens is driven towards the wide-angle direction or the telephoto direction. In accompany with the lens movement, a determination of the lens drive direction is always performed (S351) based on a detected lens barrel position signal output from a lens barrel position detector. The lens barrel position detection signal can be obtained, for example, via counting the drive pulse input to a stepping motor, which drives the lens.

As illustrated above, the lens barrel movement direction is switched while the lens is moved from the wide-angle end to the telephoto end. In the above-mentioned lens drive direction determination step S351, when the lens barrel movement direction is switched, such a case can be determined as it is. Therefore, in a following step S353, as illustrated previously, the selected voltage table is applied to the lens drive direction determined in the step S351, and the operation voltage of a lens drive section is determined. Then the drive motor is driven by the determined operation voltage, after being input to the drive motor (S363). The lens barrel is moved by the motor drive, and when the lens barrel reaches a target position ("OK" in a step S354), the operation is terminated. While the lens barrel is moved, the lens barrel position is detected by the aforementioned lens barrel position detection device/detector. Based on the lens barrel position detection signal, the drive direction is determined in the step S351.

A stop of detecting the lens barrel position is indicated by a step S355. The step S355 of detecting the lens barrel position detects the input voltage to the drive motor to determine a position of the lens barrel. The positional determination of the lens barrel is sent to the lens drive direction determination step S301. Here, the position of the lens barrel means a position of the lenses in a collapse operation area or housing operation area at the time when being moved from the wide-angle to the telephoto.

As illustrated above, according to the fourth embodiment of the present invention, in the middle of the zoom lens being moved from the wide-angle end to the telephoto end, the lens movement direction may be undesirably reversed. In the case wherein the zooming is performed while the posture of the zoom lens drive device is remained unchanged, when the lens movement direction is reversed, because the lens is driven by the appropriate force corresponding to the lens movement direction by the lens drive device, the power consumption can be suppressed.

Meanwhile, in the case wherein the input from the zoom key as one of the operation sections remains unchanged, when the lens movement direction is switched, as illustrated previously, before the switching position, the output of the lens drive device is correspondingly switched to be larger. Thus, on the one hand, the power consumption can be suppressed, and on the other hand, the switch of the lens movement direction as well as the operation afterwards of moving the lens can be performed stably.

According to the fourth embodiment of the present invention, the position in which the lens drive direction is switched, is detected by the lens position detection section. The output of the lens drive device before and behind such a position varies with the output of the acceleration detection section.

According to the fourth embodiment of the present invention, when an acceleration pattern other than anyone of the patterns from the first to the fourth, is detected by the acceleration discrimination section, on the one hand, the lens drive can be terminated by the lens drive device and on the other hand, the lens can be returned to an initial position thereof, whereby the damage to the lens drive device can be prevented and the stable drive can be secured.

In the operation example indicated in FIG. 21, although the motor operation voltage determination is performed after the acceleration determination from the step S320 to the step S333 is performed, the acceleration determination can also be performed in parallel with the motor operation voltage determination. Thus, the stability of the operation can be improved even if the posture varies while the lens drive motor is operated or an unexpected acceleration is applied.

According to one embodiment of the present invention, some effects can be obtained as follows.

The power consumption of the image pickup device can be suppressed via altering the output of the motor driving the lens barrel corresponding to the posture of the image pickup device. The stable drive of the lens barrel can be secured via terminating the drive of the lens barrel when the image pickup device is operated in the middle of the intense movement or a fall.

In the middle of the lens being moved along the optical axis by the lens drive device, the lens movement direction may be reversed. When the lens is driven while the posture of the lens drive device remain unchanged, the force required to drive the lens varies before and after the switch of the lens movement direction. According to an embodiment of the present invention, the lens acceleration pattern is classified according to the lens movement direction determined by the operation of the operating section, and the posture of the lens drive device at the time. Because the lens is driven by the appropriate force corresponding to the lens acceleration pattern, even if the lens movement direction is switched, the lens can be driven by the appropriate force, whereby the superfluous power consumption can be suppressed, and the stable drive can be secured.

Although the present invention has been described in terms of exemplary embodiments, it is not limited thereto. It should be appreciated that various changes and modifications can be made to the embodiments by persons skilled in the art without departing from the scope of the present invention as defined by the following claims.

What is claimed is:

1. A lens drive device holding at least one lens moveably along an optical axis, the lens drive device comprising:
    a drive section to drive the lens;
    an acceleration detection section to detect an acceleration; and
    an output control section to control an output of the drive section corresponding to the acceleration detected by the acceleration detection section,
    wherein the drive section includes a motor to drive the lens, and
    the output control section determines whether the acceleration detected by the acceleration detection section falls within a predetermined acceleration range or not, when the acceleration is determined to be within the range, a further determination of whether the lens drive device is in a stationary state is performed, and when it is determined not being in the stationary state, the motor is driven by a maximum drive voltage, while when it is determined being in the stationary state, a further determination of whether a posture is horizontal or not is performed, when being horizontal is determined, the motor is driven by a drive voltage appropriate for a horizontal posture, while when it is determined not being horizontal, a further determination is performed of whether to drive the motor in the gravity direction or in the direction opposite to the gravity direction, when it is determined to drive the motor in the gravity direction, the motor is driven by a lower voltage than the drive voltage appropriate for the horizontal posture, while when otherwise, the motor is driven by a voltage higher than the drive voltage appropriate for the horizontal posture and lower than the maximum drive voltage.

2. The lens drive device according to claim 1, wherein when the acceleration detection section detects the acceleration exceeding the predetermined acceleration range, the output control section is configured not to drive the motor.

3. The lens drive device according to claim 2, wherein even when the acceleration is detected to exceed the predetermined acceleration range by the acceleration detection section and the output control section does not drive the motor, once the acceleration detection section detects the acceleration falling within the predetermined acceleration range, the motor can be driven by the output control section.

4. An image pickup device comprising the lens drive device according to claim 1, and being capable of shifting the lens between a housed state in which the lens is located out of the optical axis, and a photographing state in which the lens is located on the optical axis via extending or retracting the lens with respect to the optical axis, wherein:
    when the power is on, an output of the acceleration detection section is detected; and
    when the detected output of the acceleration detection device exceeds a certain threshold, a shift from the housed state of the lens to the photographing state thereof is not performed.

5. An image pickup device comprising:
    a lens drive device holding at least one lens moveably along an optical axis, the lens drive device including a drive section to drive the lens, an acceleration detection section to detect an acceleration, and an output control section to control an output of the drive section corresponding to the acceleration detected by the acceleration detection section; and
    an imaging element circuit board, provided with an image pickup element to convert a subject image obtained by the lens into an electrical signal,
    wherein when the image pickup device is switched on, the acceleration detection is performed prior to the lens drive, and upon the detected acceleration exceeding a prescribed range, the lens drive is terminated, followed by a shift to a suspension state in which a photographing cannot be performed.

6. The image pickup device according to claim 5, wherein the acceleration detection section is provided on the imaging element circuit board.

7. The image pickup device according to claim 6, wherein the acceleration detection section is provided on a surface of the imaging element circuit board opposite to a surface whereon the image pickup element is provided.

8. The image pickup device according to claim 5, wherein the image pickup device includes a lens barrel unit and the acceleration detection section is provided in the lens barrel unit.

9. The image pickup device according to claim 8, wherein the acceleration detection section is provided on a rear surface of the lens barrel unit.

10. The image pickup device according to claim 5, wherein even when in the suspension state, the acceleration detection is still performed by the acceleration detection section, and upon the detected acceleration falling within the prescribed range, the suspension state is discontinued, followed by a shift to a state in which the photographing can be performed.

11. A lens drive device holding at least one lens moveably along an optical axis, the lens drive device comprising:
    a drive section to drive the lens;
    acceleration detection section detect an acceleration; and
    an output control section to control an output of the drive section corresponding to the acceleration detected by the acceleration detection section,
    wherein the lens drive device includes:
    a lens position detection section to detect a position of the lens;
    an operating section to perform an input operation so as to operate the lens drive device;
    a drive direction discrimination section to discriminate a drive direction of the lens drive device, based on an input from the operating section and a lens position detection signal obtained from the lens position detection section; and wherein
    the output control section includes an acceleration discrimination section to discriminate an acceleration pattern among
    a first acceleration pattern in which the lens drive device is driven by a first output;
    a second acceleration pattern in which both an operation output for extension and an operation output for collapse are increased to be larger than the first output, based on an input from the operating section;

a third acceleration pattern in which compared with the first output, the operation output for extension is decreased while the operation output for collapse is increased, based on the input from the operating section; and a fourth acceleration pattern in which compared with the first output, the operation output for extension is increased while the operation output for collapse is decreased, based on the input from the operating section; and the output control section controls the output of the lens drive device based on both a discriminated lens drive direction, obtained from the lens drive direction discrimination section, and a discriminated acceleration pattern obtained by the acceleration discrimination section.

12. The lens drive device according to claim 11, when even the input from the operating section remains unchanged and the lens drive direction is switched in the middle of the lens movement, wherein before the lens is driven to a switching position, an output of the lens drive device is increased.

13. The lens drive device according to claim 11, wherein when an acceleration pattern other than anyone of the acceleration patterns from the first to the fourth is detected by the acceleration discrimination section, the lens drive is terminated by the lens drive device.

14. The lens drive device according to claim 11, wherein when an acceleration pattern other than anyone of the acceleration patterns from the first to the fourth is detected by the acceleration discrimination section, the lens is returned to an initial position thereof.

15. The lens drive device according to claim 11, wherein while the lens is driven by the lens drive device, the output of the lens drive device is varied with an output from the lens position detection section and the acceleration detection section.

16. An image pickup device including the lens drive device according to claim 11.

17. A method of driving at least one lens in a lens barrel holding the lens moveably by a motor, the method comprising:

detecting an acceleration working on the lens; and controlling an output of the motor to select an optimum output of the motor corresponding to the detected acceleration; wherein the controlling of the output of the motor comprising:

determining whether the acceleration detected by the acceleration detection section falls within a predetermined acceleration range or not, and then when the acceleration is determined to be within the range, further determining whether being in a stationary state or not; and when it is determined not being in the stationary state, driving the motor with a maximum drive voltage;

further determining whether being horizontal or not, based on the determination of being in the stationary state, and then when being horizontal is determined, driving the motor by a drive voltage appropriate for being horizontal;

further determining whether to drive the motor in the gravity direction or in the direction opposite to the gravity direction, based on the determination of not being horizontal;

driving the motor by a lower voltage than the drive voltage appropriate for being horizontal, based on the determination of driving the motor in the gravity direction; and driving the motor by a voltage higher than the drive voltage appropriate for being horizontal and lower than the maximum drive voltage, based on the determination of driving the motor in the direction opposite to the gravity direction.

18. The lens drive method according to claim 17, wherein when the acceleration is detected exceeding the predetermined acceleration range in the step of detecting the acceleration working on the lens, in the step of controlling the output of the motor, the motor is not driven.

* * * * *